Dec. 27, 1949     G. VALENSI     2,492,926
COLOR TELEVISION SYSTEM
Filed Oct. 5, 1945     15 Sheets-Sheet 1
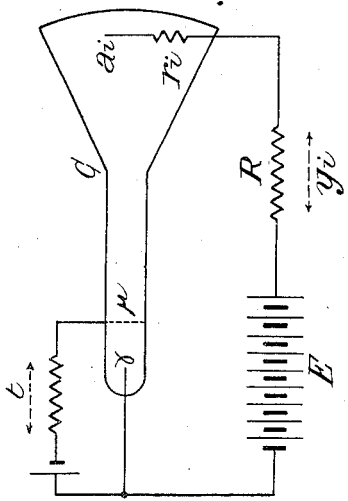
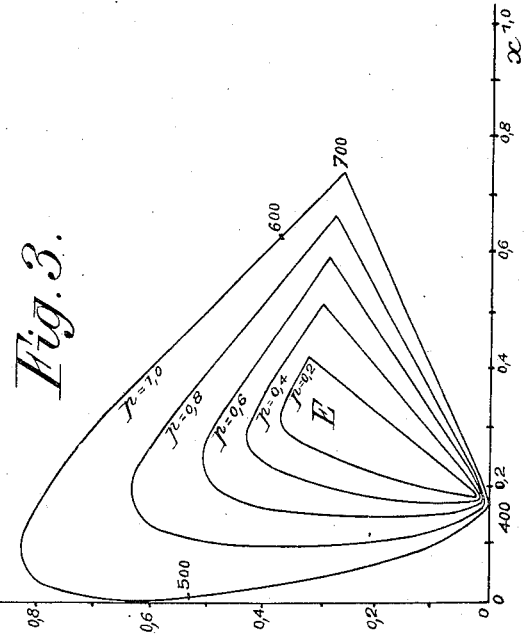
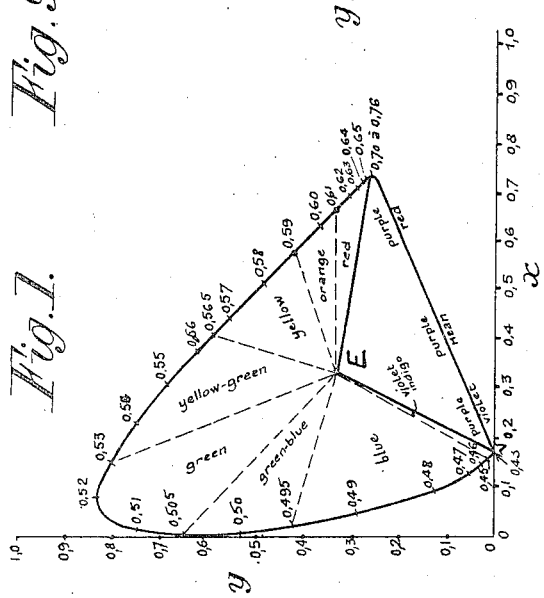
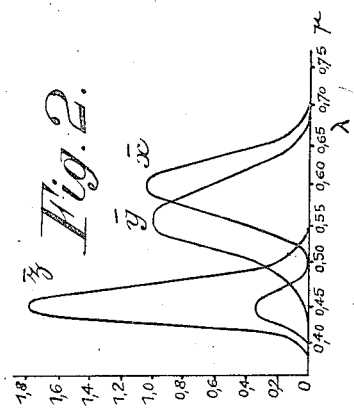
Inventor:
Georges Valensi
By Brown & Deward
Attorneys Dec. 27, 1949          G. VALENSI          2,492,926
COLOR TELEVISION SYSTEM
Filed Oct. 5, 1945                           15 Sheets-Sheet 2
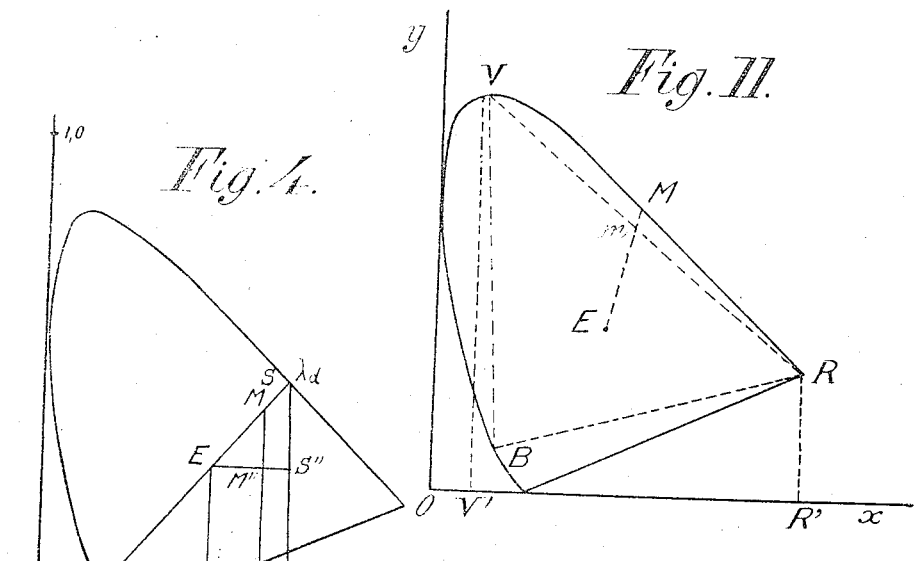
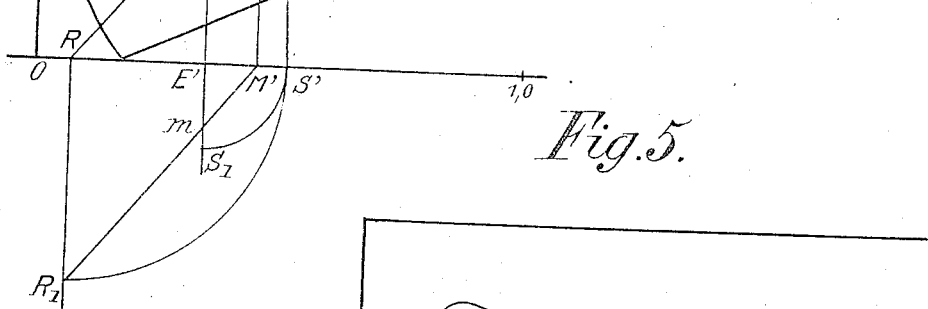
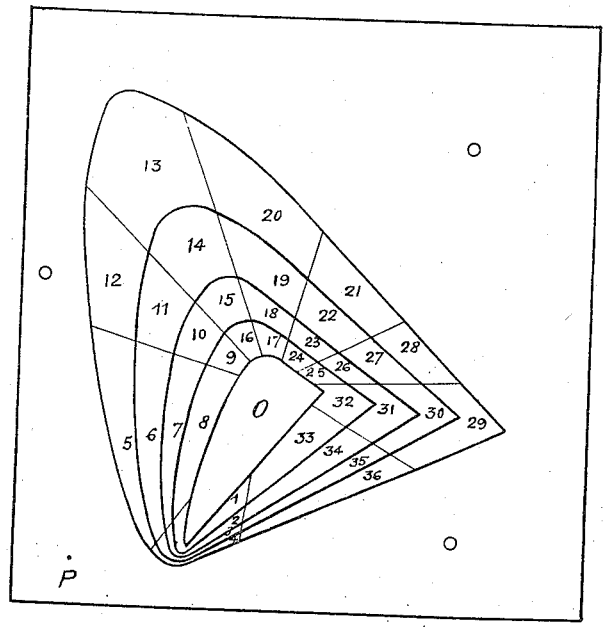
Inventor:
Georges Valensi
By Brown & Seward
Attorneys

Dec. 27, 1949            G. VALENSI            2,492,926
COLOR TELEVISION SYSTEM
Filed Oct. 5, 1945            15 Sheets-Sheet 4
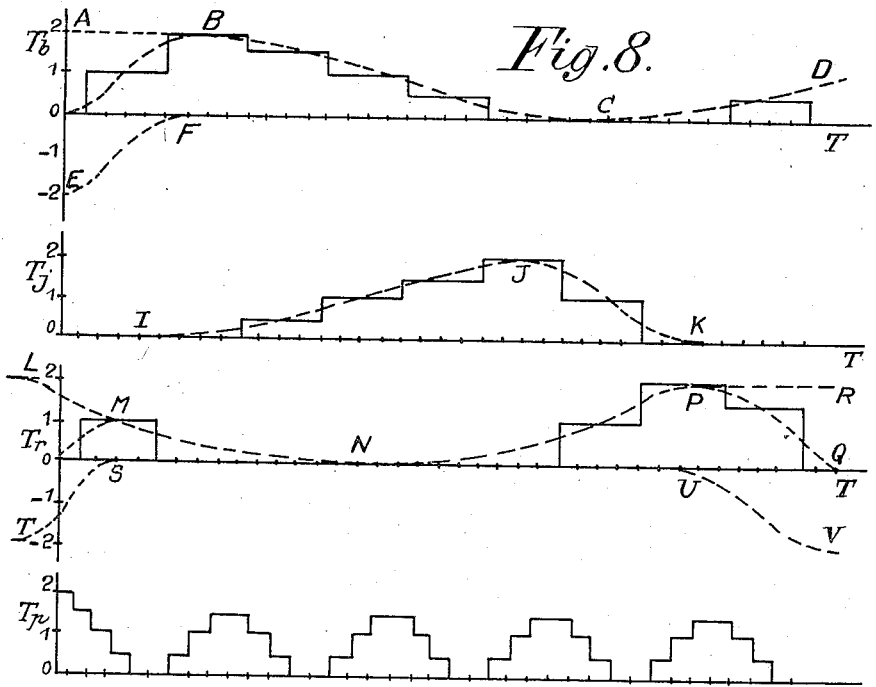
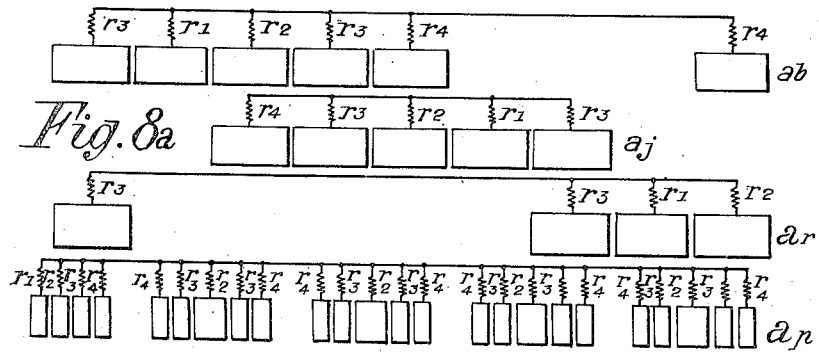
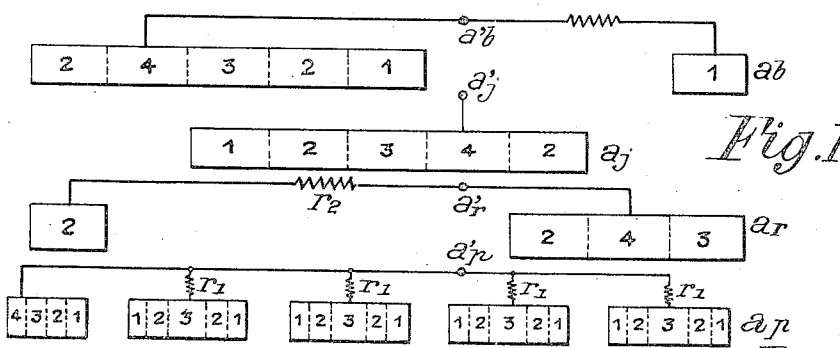
Inventor:-
Georges Valensi
By Brown & Deward
Attorneys

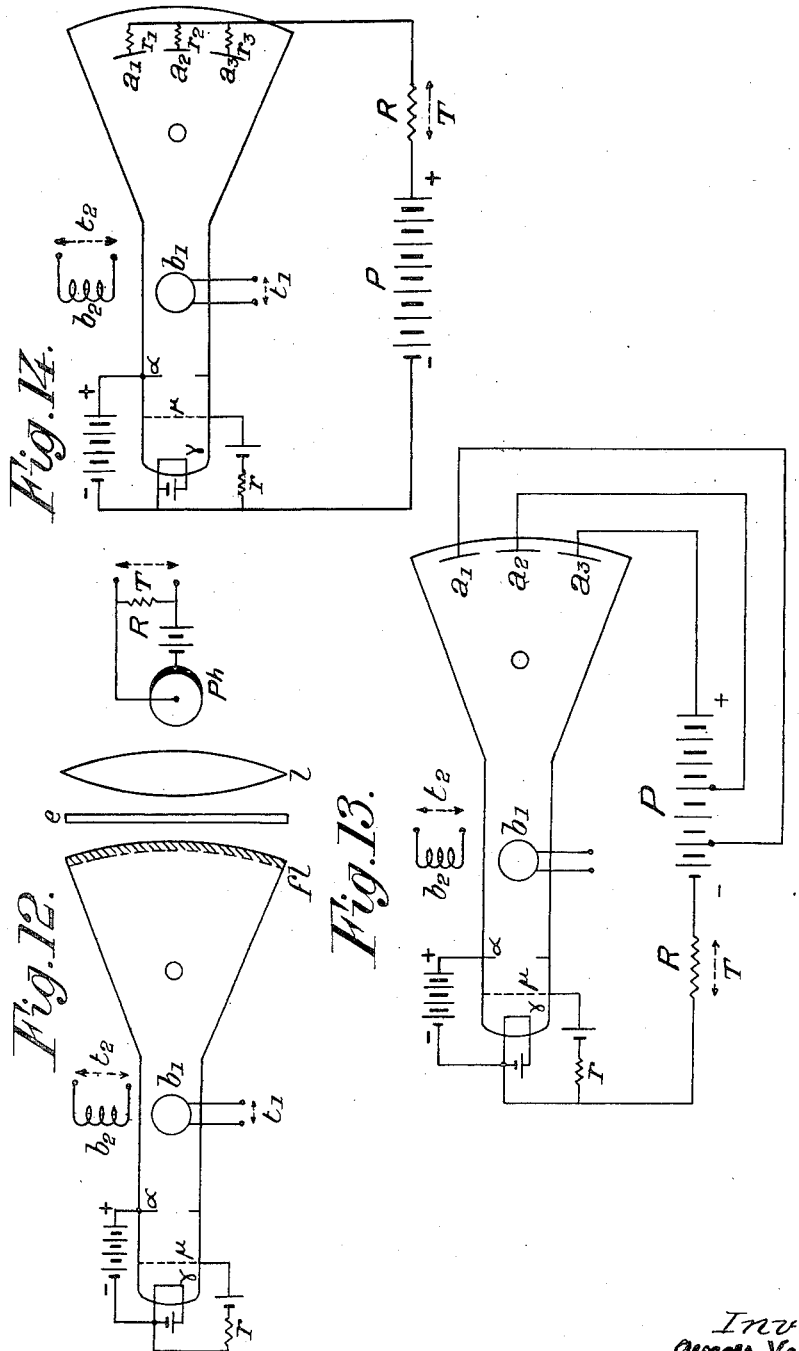

Dec. 27, 1949  G. VALENSI  2,492,926
COLOR TELEVISION SYSTEM
Filed Oct. 5, 1945  15 Sheets-Sheet 6
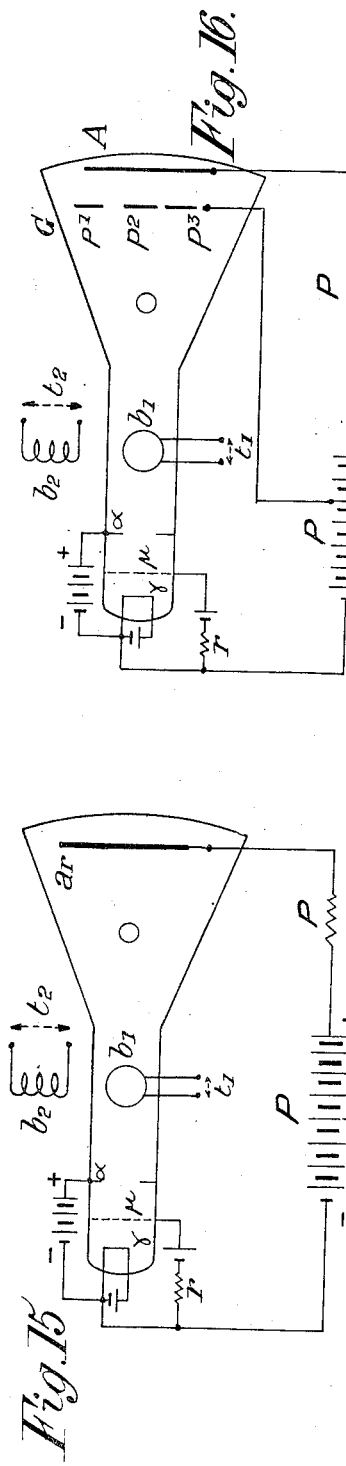
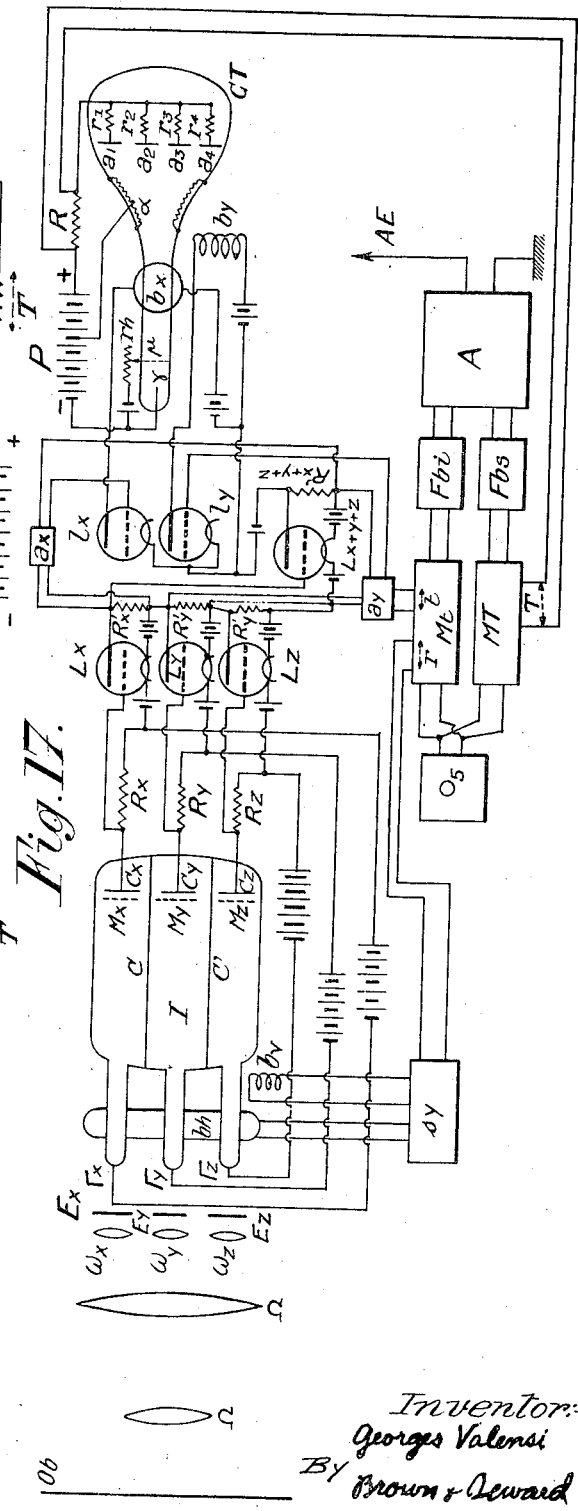
Inventor:
Georges Valensi
By Brown & Seward
Attorneys Dec. 27, 1949  G. VALENSI  2,492,926
COLOR TELEVISION SYSTEM
Filed Oct. 5, 1945  15 Sheets-Sheet 7
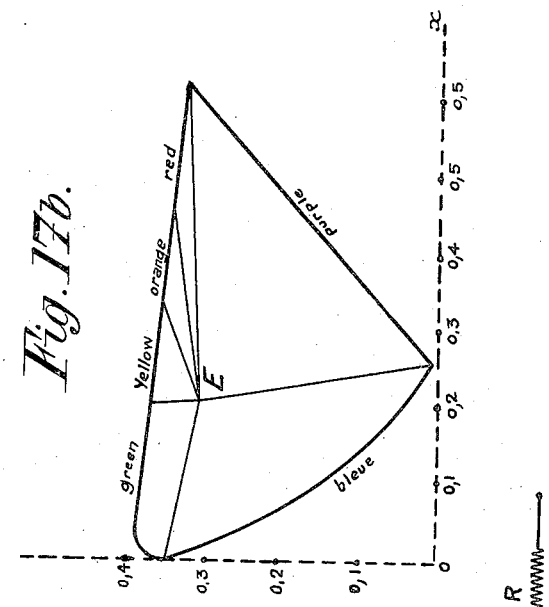
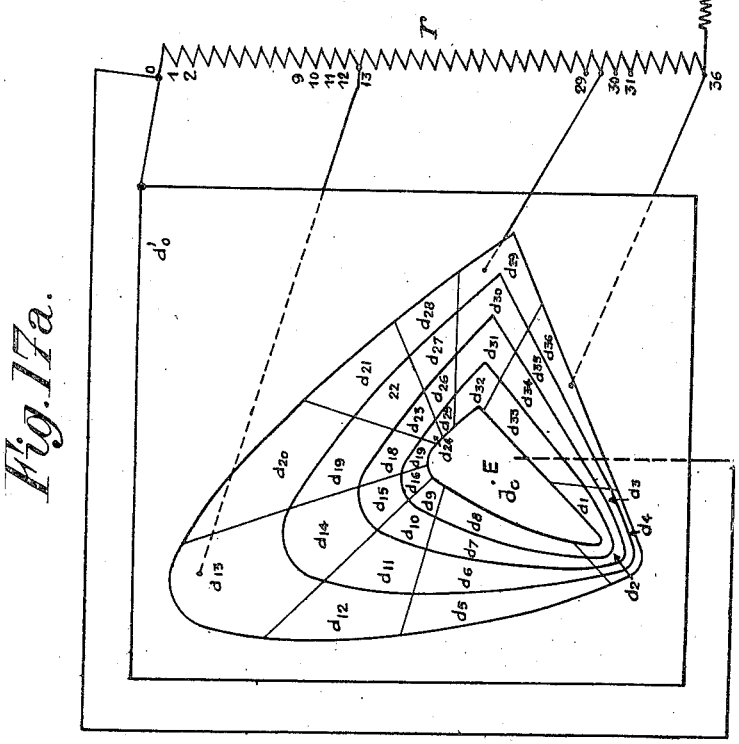
Inventor:-
Georges Valensi
By Brown & Oeward
Attorneys Dec. 27, 1949     G. VALENSI     2,492,926
COLOR TELEVISION SYSTEM
Filed Oct. 5, 1945     15 Sheets-Sheet 8

Inventor:-
Georges Valensi
By Brown & Deward
Attorneys

Dec. 27, 1949    G. VALENSI    2,492,926
COLOR TELEVISION SYSTEM
Filed Oct. 5, 1945.    15 Sheets-Sheet 9
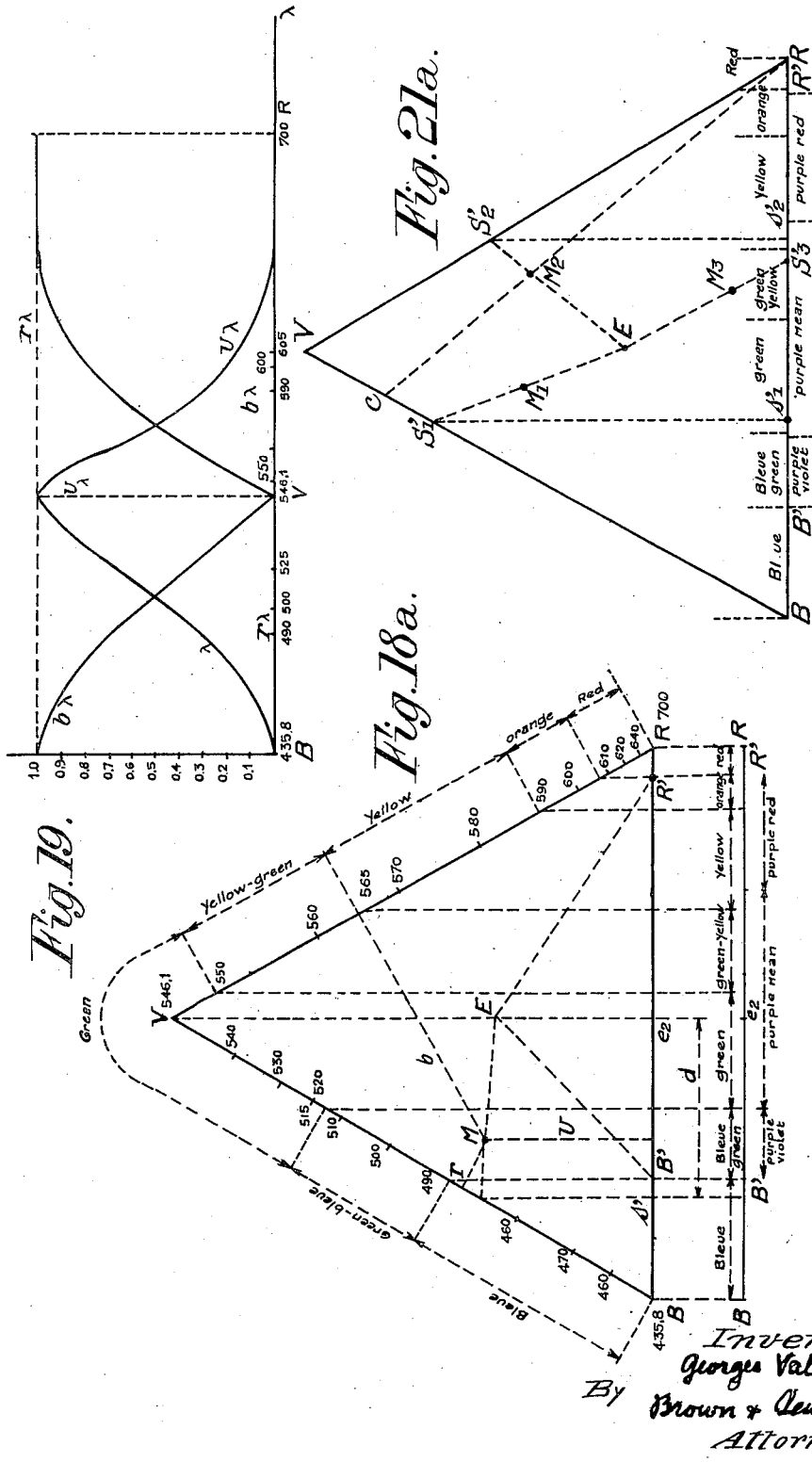
Inventor:
Georges Valensi
By Brown & Deward
Attorneys

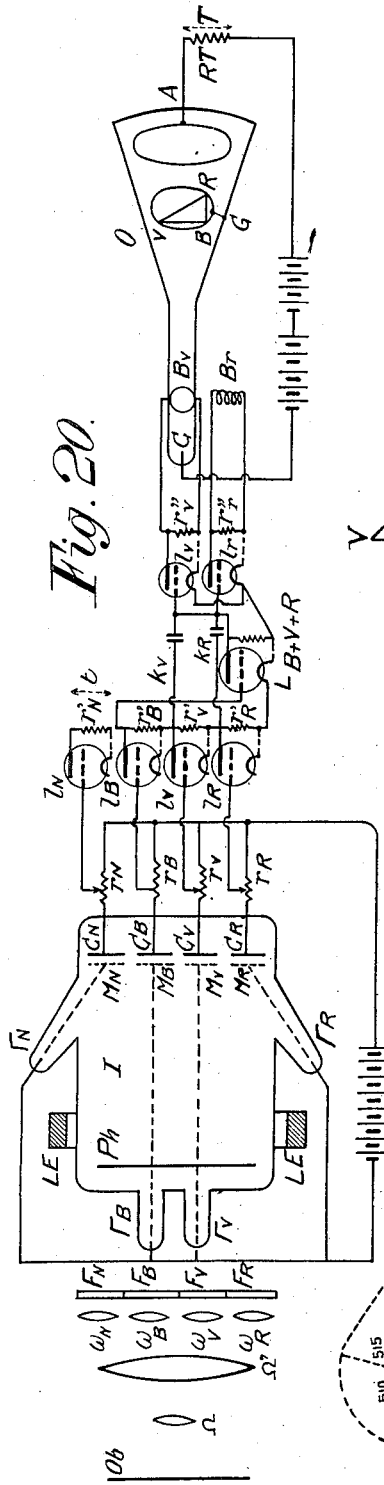
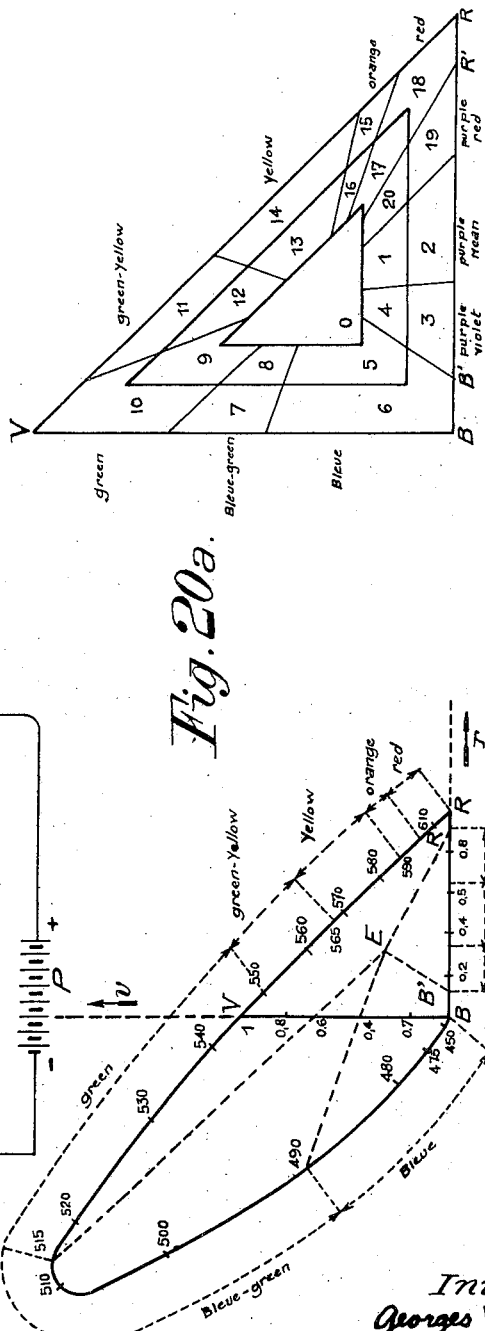

Dec. 27, 1949     G. VALENSI     2,492,926
COLOR TELEVISION SYSTEM
Filed Oct. 5, 1945     15 Sheets-Sheet 11
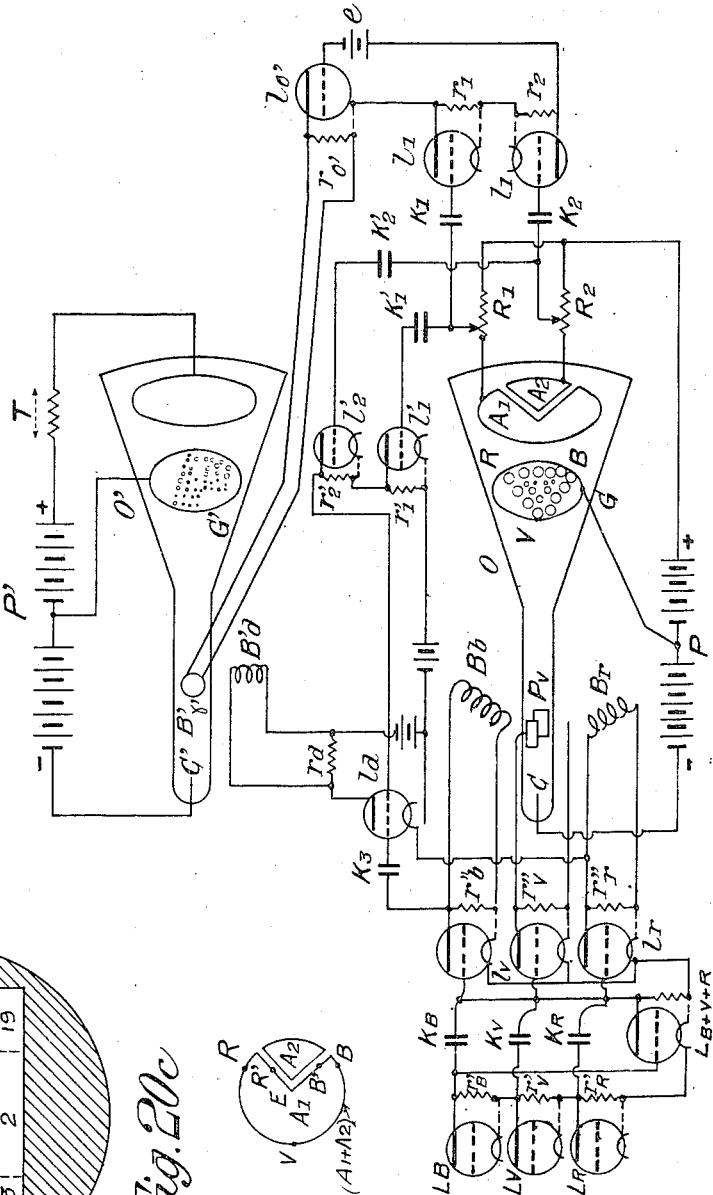
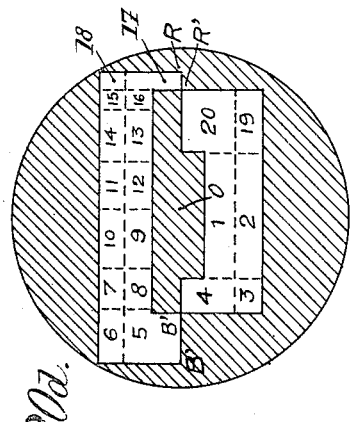
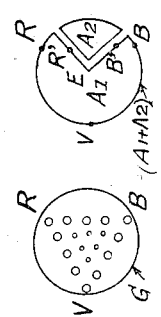
Inventor:-
Georges Valensi
By Brown + Deward
Attorneys Dec. 27, 1949 G. VALENSI 2,492,926
COLOR TELEVISION SYSTEM
Filed Oct. 5, 1945 15 Sheets-Sheet 12
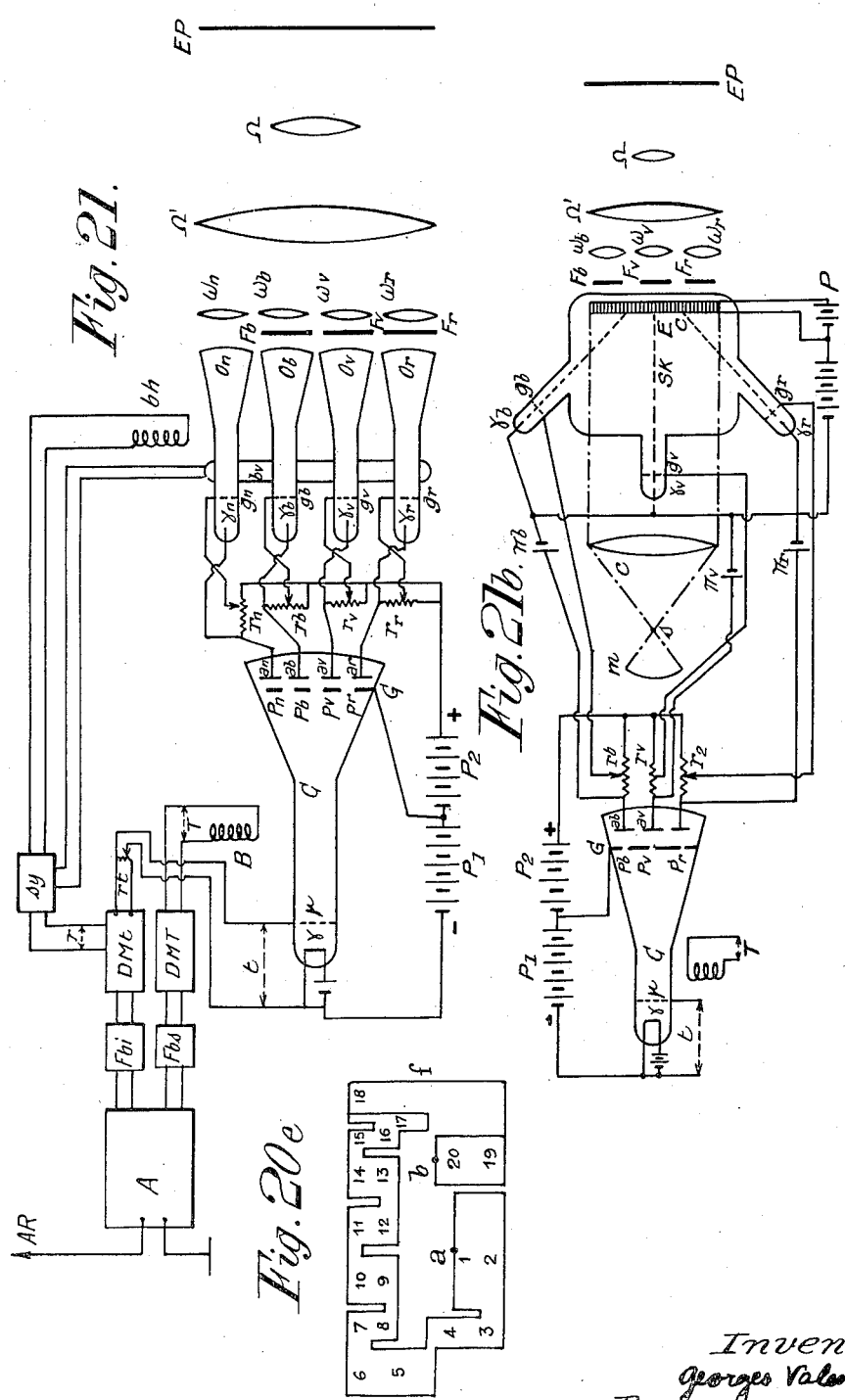

Dec. 27, 1949    G. VALENSI    2,492,926
COLOR TELEVISION SYSTEM
Filed Oct. 5, 1945    15 Sheets-Sheet 13

Inventor:-
Georges Valensi
By Brown & Seward
Attorneys

Dec. 27, 1949　　　　　　G. VALENSI　　　　　　2,492,926
COLOR TELEVISION SYSTEM
Filed Oct. 5, 1945　　　　　　　　　　　　　15 Sheets—Sheet 14
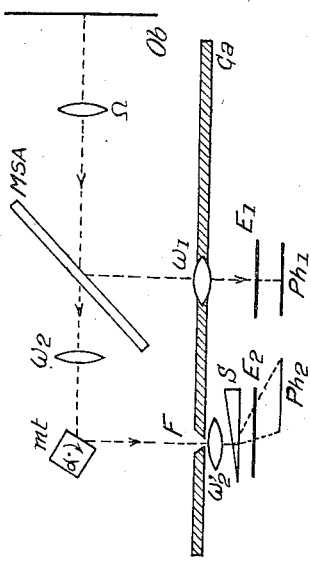
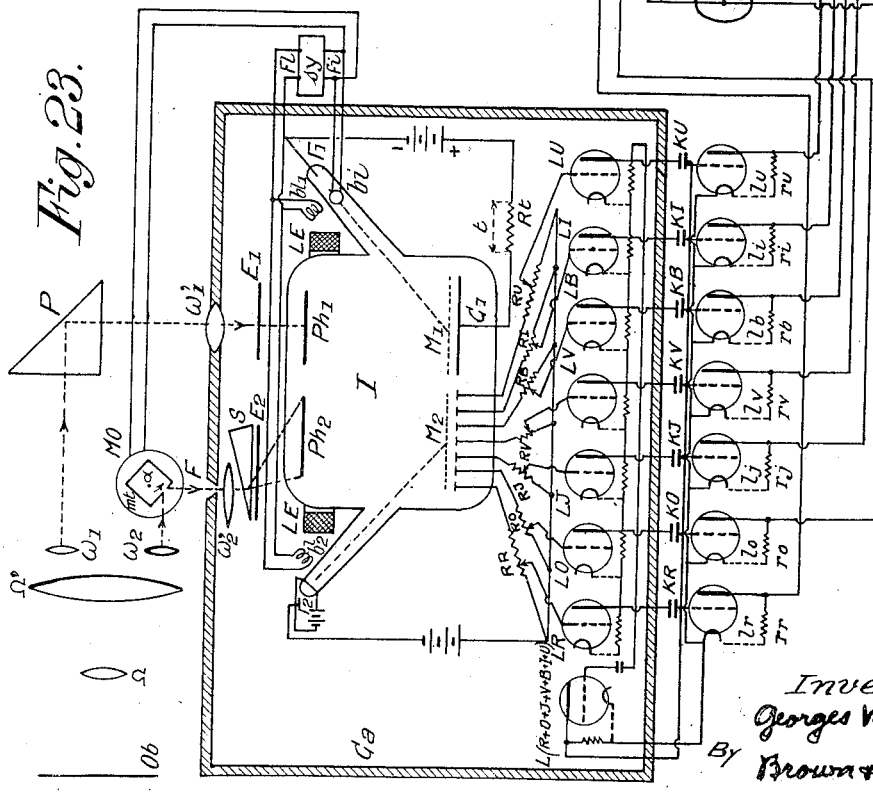
Inventor:
Georges Valensi
By Brown & Seward
Attorneys

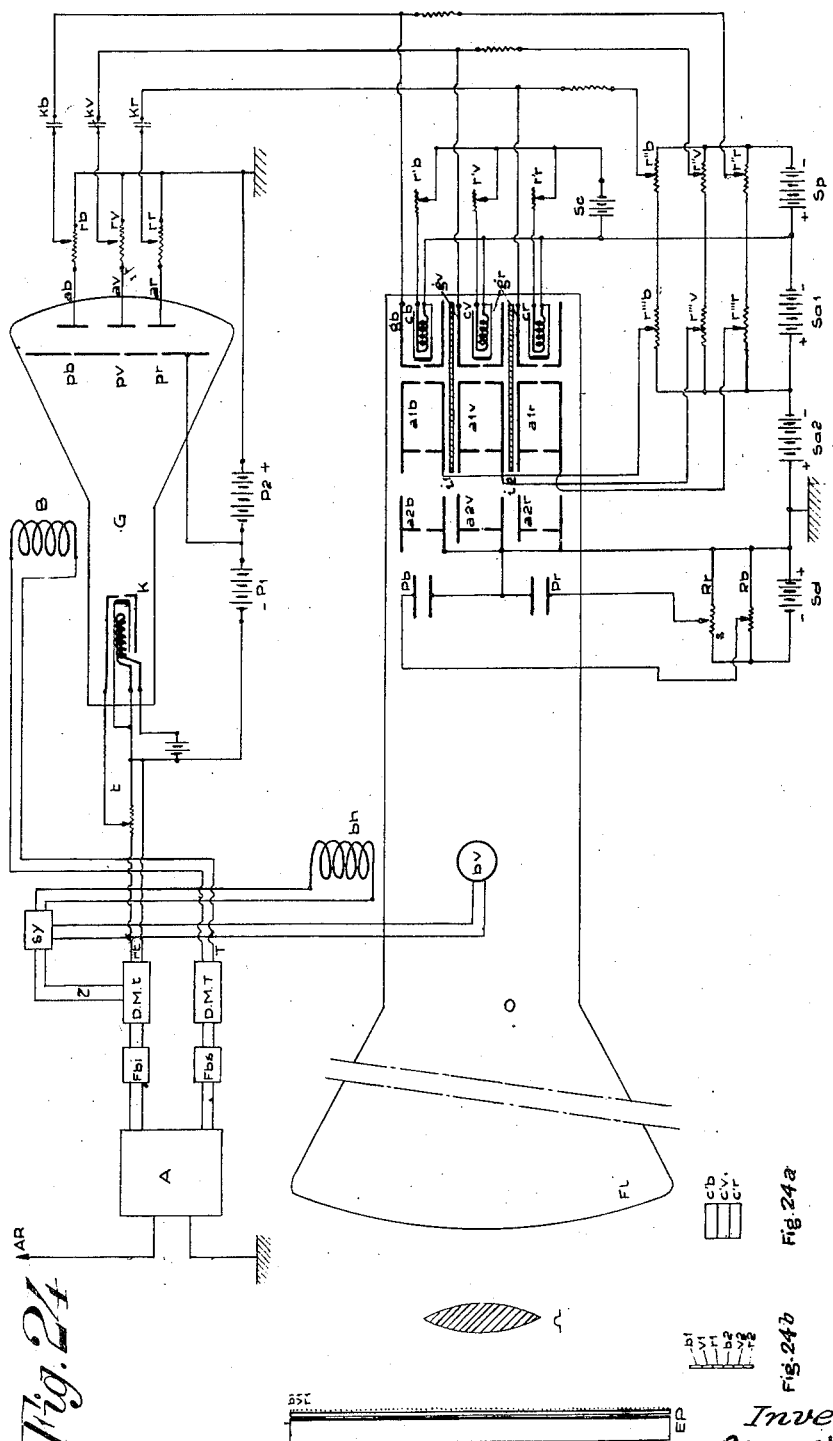

Patented Dec. 27, 1949

2,492,926

UNITED STATES PATENT OFFICE 2,492,926

COLOR TELEVISION SYSTEM

Georges Valensi, Paris, France

Application October 5, 1945, Serial No. 620,566
In France March 6, 1942

14 Claims. (Cl. 178—5.2)

Section 1, Public Law 690, August 8, 1946
Patent expires March 6, 1962

The present invention relates to color television systems of the kind described in my U. S. Patent No. 2,375,966, according to which every elemental area of the picture scanned at a given instant has its color transmitted through a single coded signal, which implies the use of a coding device at the transmitting end and a decoding device at the receiving end.

A chief object of the present invention consists in providing improvements in such television systems, especially concerning the coding and decoding devices thereof.

Other objects of my invention will result from the following detailed description of some specific embodiments thereof, with reference to the accompanying drawings, given merely by way of example, and in which:

Figs. 1 to 4 are diagrams giving colorimetric data;

Fig. 5 shows a screen for use in connection with a television system according to the invention;

Figures 6, 7:
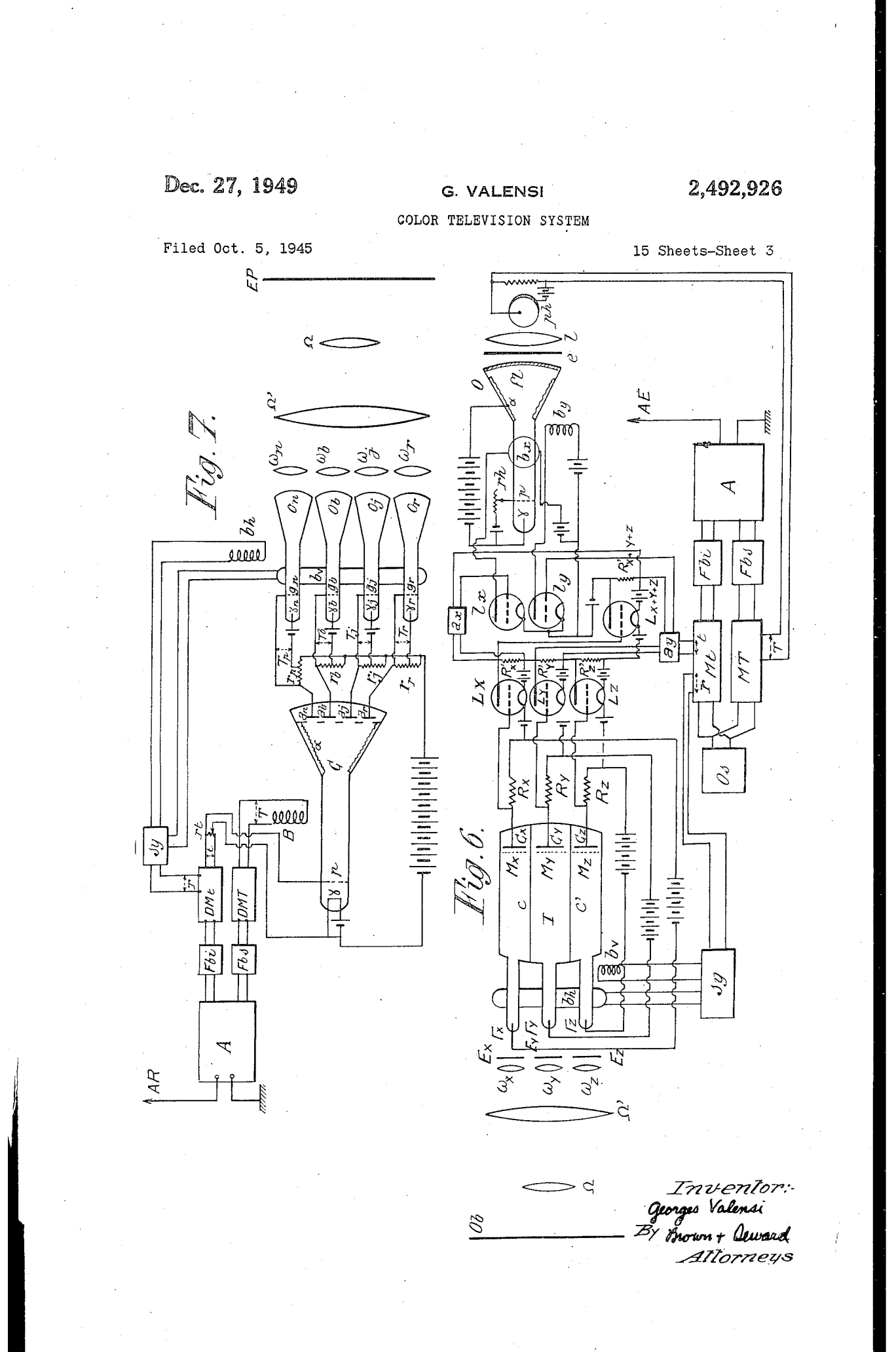

Fig. 6 is a diagrammatical view of a color television system transmitting station made according to an embodiment of my invention;

Fig. 7 is a diagrammatical view of a corresponding receiving station;

Figs. 8 and 8a are diagrams;

Fig. 9 is a diagrammatic explanatory view;

Figs. 10 and 11 are diagrams;

Figure 22A:
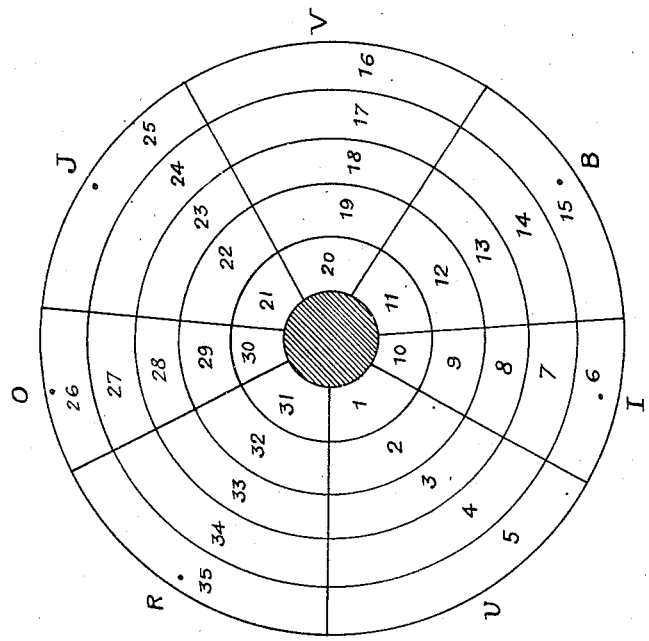
Figure 22:
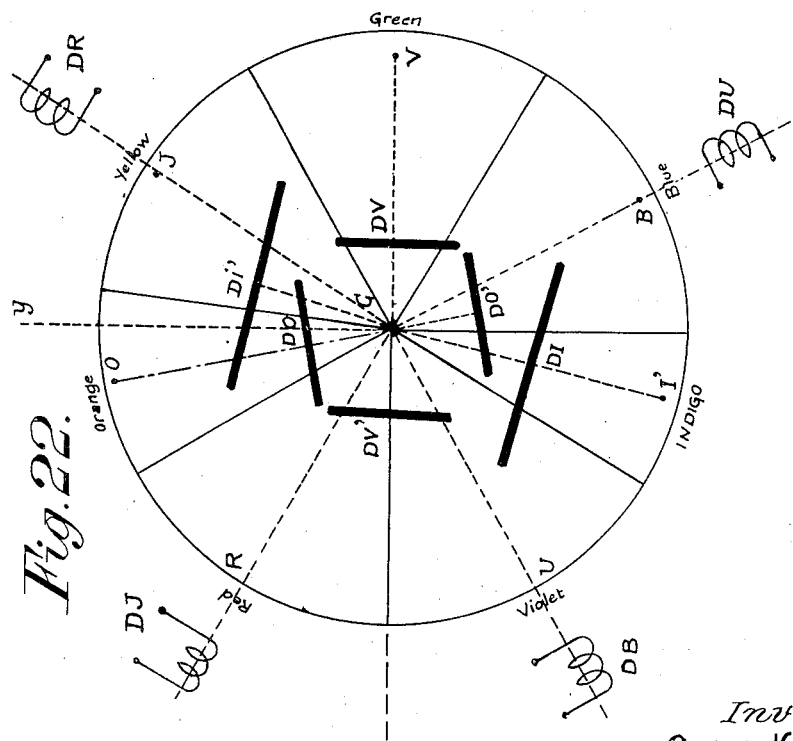

Figs. 12 to 16 inclusive are diagrammatical views of five different coding or decoding devices to be used in television systems according to my invention;

Fig. 17 is a diagrammatical view of a modification of the transmitter of Fig. 6;

Fig. 17a shows the anode arrangement of the device of Fig. 17;

Fig. 17b is a diagram;

Figs. 18, 18a, 18b and 19 are also diagrams;

Fig. 20 is a diagrammatical view of still another color television transmitter according to the invention;

Fig. 20a shows two corresponding diagrams;

Fig. 20b shows a coding device corresponding to a modification of Fig. 20;

Figs. 20c, 20d and 20e are detail views;

Fig. 21 shows a receiver corresponding to the transmitter of Fig. 20;

Fig. 21a shows a corresponding diagram;

Fig. 21b is a diagrammatical view of a modification of the receiver of Fig. 21;

Fig. 22 is a diagram illustrating the principle of another form of my invention;

Fig. 22a shows a corresponding grid;

Fig. 23 is a diagrammatical view of a transmitter made according to the principle illustrated by Fig. 22;

Fig. 23a shows a modification;

Fig. 24 is a view of a color television receiver including a single oscillograph, according to the invention;

Figs. 24a and 24b are detail views corresponding to Fig. 24.

In my U. S. Patent No. 2,375,966, of May 15, 1945, and especially with reference to Figs. 11 and 13 of the drawings of this patent, I have described a color television system based upon the use of Maxwell's triangle of colors.

A first object of my invention is to provide improvements in such systems.

According to my invention, instead of making use of an equilateral Maxwell's triangle and trichromatic coordinates respectively plotted along the sides of this equilateral triangle, I make use of a right-angled triangle and rectangular coordinates. This makes it possible to utilize, at the transmitting station, as cathode ray oscillograph provided with a fluorescent screen (in front of which is disposed a screen carrying a right-angled Maxwell's triangle the various parts of which are more or less transparent according to the code that is adopted) an oscillograph of the conventional kind the cathode rays beam of which is deviated, in two directions at right angles to each other, by suitable magnetic or electric fields.

On the other hand, instead of utilizing, at the transmitting station, three distinct iconoscopes, I make use of a triple iconoscope I in combination with colored screens $E_x$, $E_y$, $E_z$ of suitable colors corresponding respectively to the three photosensitive mosaics $M_x$, $M_y$, $M_z$ of this triple iconoscope (see Fig. 6).

This triple iconoscope directly produces electrical voltates proportional to quantities $\Sigma e_{\lambda n} \bar{x}_n$, $\Sigma e_{\lambda n} \bar{y}_n$ and $\Sigma e_{\lambda n} \bar{z}_n$, in which $e_{\lambda n}$ designates the proportion of energy transported during every second in the form of a monochromatic radiation of wave length $\lambda_n$ by the colored flux transmitted by the element of the televisioned object that is considered, and in which $\overline{x}_n$, $\overline{y}_n$ and $\overline{z}_n$ are the "distribution coefficients for excitations of the same energy." As $\overline{y}_n$ is the factor of visibility for the monochromatic radiation $\lambda$, quantity $\Sigma e_{\lambda n}\overline{y}_n$ is equal to the luminous flux, that is to say corresponds to the sensation of luminosity or brightness produced on the average human eye by the element of the televisioned object that is considered.

Furthermore, according to this embodiment of my invention, I make use, at the transmitting station, of a variable slope tube device inserted between the triple iconoscope I and the means for deflecting the cathode rays beam of oscillograph o. Owing to the provision of this device, the point where the cathode rays beam impinges upon the fluorescent screen of oscillograph o is always perfectly well positioned with respect to the Maxwell's triangle of screen e, whatever be the brightness of the element of the televisioned object that is considered.

Finally, at the receiving station, instead of making use of four cathode ray oscillographs, provided with a white, blue, yellow and red screen, respectively, as described in my prior U. S. patent above referred to, I utilize, according to the present invention, a quadruple cathode ray oscillograph with a white fluorescent screen in front of which are placed colored screens and juxtaposed lenses which superpose on the projection screen the various images (to wit, the white, blue, yellow and red images) of the televisioned object. With this quadruple cathode ray oscillograph is combined a control organ C which plays the part of quadruple cathode ray switch means directly supplying the modulating voltages for the white, blue, yellow and red components (see Fig. 7).

Fig. 1 shows the Maxwell colorimetric diagram in rectangular coordinates in the form recommended by the International Illumination Commission. Point E corresponds to the "spectrum of equal energy" (conventional white). The various points of the curve represent the saturated simple colors (monochromatic radiations the wave lengths of which are indicated in microns). Numbers $\overline{x}$, $\overline{y}$ and $\overline{z}$, called "distribution coefficients for the excitations of the same energy" and the variations of which as a function of wave length $\lambda$ are shown by the curves of Fig. 2 directly give the trichromatic coefficients X, Y and Z and therefore the coordinates $x=X$ and $y=Y$ of the point representing the monochromatic radiation the wave length of which is indicated opposite. Finally, on Fig. 1, line VR is the "purple line," all the points located inside triangle EVR representing more or less saturated purple colors. The dotted lines separate from one another the sectors corresponding to the chief colors that the normal human eye can differentiate from one another.

Fig. 3 represents the lines of equal "factor of colorimetric purity" $p$, and Fig. 4 indicates a geometrical construction for obtaining a point M of one of the curves of Fig. 3. The "factor of colorimetric purity" $p$ is a fraction having as its numerator the luminosity or brightness of the monochromatic radiation of wave length $\lambda_d$ that must be added to a white radiation (spectrum of equal energy) for reproducing the aspect of a given colored radiation the predominating element of which is a radiation of wave length $\lambda_d$, and having as its denominator the total luminosity or brightness of this colored radiation. This factor $p$ of colorimetric purity is different from the "degree of saturation" $s$, which is also sometimes called "factor of purity of excitation." It has the advantage, over this degree of saturation $s$, of being independent of the reference system that is used for the graphical representation of colors.

The factor $p$ of colorimetric purity of the color represented by point M in Maxwell's triangle (Fig. 4) is equal to $$p = \frac{SS'}{MM'} \times \frac{MM'-EE'}{SS'-EE'}$$

in which MM' is the second trichromatic coefficient Y relative to the color represented by point M; EE' is equal to 0.333 (ordinate of point E which represents conventional white); and SS' is the second trichromatic coefficient $Y_d$ relative to the predominating monochromatic radiation (or relative to the saturated purple of the same shade). The predominating radiation is given by the point S of intersection of the curve of simple colors with straight line EM, in the case of a color other than a purple. The saturated purple of the same shade is given by the intersection of the "purple line" with line EM, in the case of a purple color.

Fig. 4 shows that a point M of predominating radiation $\lambda_d$ and the factor of colorimetric purity of which is $p$ can be obtained through the following geometric construction: The straight line passing through points E (conventional white) and S (monochromatic radiation of wave length $\lambda_d$) intersects at R the axis of abscissas of the colorimetric diagram. On straight lines perpendicular to the axis of abscissas at points R and E' are plotted distances $RR_1=RS'$ and $E'S_1=E'S'$. On $E'S_1$ I determine a point $m$ such that:

$$\frac{E'm}{E'S_1}=p \text{ (value of the colorimetric purity factor)}$$

Straight line $R_1M$ intersects the axis of abscissas at M' and the parallel M'M to the axis of ordinates intersects straight line RES at the point M to be found.

This results from the following calculations: On the one hand:

$$\frac{MM'-EE'}{SS'-EE'}=\frac{MM''}{SS''}=\frac{EM''}{ES''}=\frac{E'M'}{E'S'}$$

and $$\frac{SS''}{MM''}=\frac{RS'}{RM'}$$

so that:

$$\frac{SS'}{MM'} \times \frac{MM'-EE'}{SS'-EE'}=\frac{RS'}{RM'} \times \frac{E'M'}{E'S'}=\frac{E'M'}{RM'} \times \frac{RS'}{E'S'}$$

On the other hand:

$$\frac{E'M'}{RM'}=\frac{E'm}{RR'}=p \times \frac{E'S_1}{RR_1}=p \times \frac{E'S'}{RS'}$$

so that:

$$p=\frac{E'M'}{RM'} \times \frac{RS'}{E'S'}$$

An element of the televisioned colored object is perfectly well determined if the following factors are given, to wit: (a) its brightness, $\Sigma e_{\lambda n}\overline{y}_n$; (b) its predominating wave length, $\lambda_d$; and (c) its colorimetric purity factor $p$.

Fig. 5, deduced from Figs. 1 and 3 shows a screen e (white, grey and black) called "graduated transparency screen." It includes 38 portions. The central portion and the peripheral portion, both marked 0 (zero), are as opaque as possible. The central portion corresponds to white, or to shades so little saturated that they can be considered as white ($p$ lower than 0.2). The portions marked from 1 to 36 are of transparencies that increase for instance according to a linear law. All the points of the same portion of the screen represent colored aspects sufficiently similar for being considered as practically identical for commercial television purposes. An electric signal of an intensity proportional to the number of a screen portion therefore characterises in a sufficiently precise manner the colored aspect (predominating radiation and purity) for the standard observer of the Internal Illumination Commission (that is to say for the normal human eye) of the element of the televisioned object that is considered at the time of transmission, that is to say under the conditions of illumination of the studio (or landscape). Therefore, the purpose, in the present case, is not to characterize the color of an element of an object, and the objections sometimes made to Maxwell's colorimetric diagram, in particular due to Purkinge's phenomenon, have no bearing on the color television system according to my invention.

Fig. 6 diagrammatically shows an embodiment of a color television transmitter according to my invention. The televisioned object is $Ob$; $\Omega$ is an objective, $\Omega'$ a collecting lens, $\omega_x$, $\omega_y$, $\omega_z$ three objectives juxtaposed in the same plane and respectively associated with three transparent colored screen $E_x$, $E_y$, $E_z$ and with the three photosensitive mosaics $M_x$, $M_y$, $M_z$ of the triple inconoscope I, which is supposed to be seen in projection on a horizontal plane. $\Omega'$ is optically conjugated with $Ob$ with respect to $\Omega$. The plane of $\omega_x$, $\omega_y$, $\omega_z$ is opticalyl conjugated with $\Omega$ with respect to $\Omega'$. Finally, the plane of mosaics $M_x$, $M_y$, $M_z$ is optically conjugated with $\Omega'$ with respect to plane $\omega_x$, $\omega_y$, $\omega_z$. Therefore, I obtain on mosaics $M_x$, $M_y$, $M_z$ three images of object $Ob$ having the same point of view. These three images are synchronously scanned by three cathode rays beams respectively issued from cathodes $\Gamma_x$, $\Gamma_y$, $\Gamma_z$, for the three cathode rays beams are simultaneously deviated by the magnetic fields produced by coils $bv$ and $bh$ fed from the synchronization current generator $sy$ coil $bv$ producing the vertical sweeping and coil $bh$ the horizontal sweeping of the mosaics). Vertical non-magnetic metal partitions $c$, $c'$ prevent any interaction (through mutual repulsion of electrons) between these three cathode rays beams. As these partitions are made of non-magnetic metal, they do not perturb the magnetic fields of coils $bv$ and $bh$.

The law of variation of the transparency $\delta x_n$ of colored screen $E_x$ as a function of the wave length $\lambda_n$ and the law of variation of the photoelectric sensitivity $\rho x_n$ of the corresponding mosaic $M_x$ as a function of $\lambda_n$ must be so interrelated that the electric voltage collected across the terminals of the output resistance $R_x$, connected with collecting plate $C_x$, is proportional to $\Sigma e_{\lambda n} \overline{x}_n$, $e_{\lambda n}$ being the proportion of energy transported per second in the form of monochromatic radiation of wave length $\lambda_n$ by the colored flux transmitted by the element of the televisioned object that is scanned at this time. Therefore, for every value of $\lambda_n$, I must have $\delta x_n \rho x_n = \overline{x}_n$. In view of the shape of the curve giving the variations of $\overline{x}$ as a function of the wave length (see Fig. 2), this result is obtained by making use, for instance, for constituting photosensitive mosaic $M_x$, particles of cesium oxide CsO, and for screen $E_x$ a purple colored filter elimination green-blue and green radiations.

In a likewise manner, the law of variation of the transparency $\delta y_n$ of colored screen $E_y$ as a function of wave length $\lambda_n$ and the law of variation of the photo-electric sensitivity $\rho y_n$ of mosaic $M_y$ as a function of $\lambda_n$ must be so interrelated that the electric voltage collected across the terminals of resistance $R_y$ is proportional to $\Sigma e_{\lambda n} \overline{y}_n$. In view of the shape of the curve that represents $\overline{y}$ as a function of the wave length, as shown by Fig. 2 (it is also the curve of visibility for the normal human eye), this result is obtained by employing for instance, for constituting the photosensitive mosaic $M_y$, particles of cesium-rubidium on silver and for screen $E_y$ a suitable colored screen (for instance a tank having glass walls and containing a solution of red copper chloride $CuCl_2$, of green cobalt and ammonium double sulfate $SO_4Co.SO_4(NH_4)_2$, and of violet potassium chromate $(Cr_2O_7K_2)$.

Finally, the law of variation of the transparency $\delta z_n$ of colored screen $E_z$ as a function of the wave length $\lambda_n$ and the law of variation of the photo-electric sensitivity $\rho z_n$ of mosaic $M_z$ as a function of $\lambda_n$ must be so interrelated that the electric voltage collected across the terminals of resistance $R_z$ is proportional to $\Sigma e_{\lambda n} \overline{z}_n$. In view of the shape of the curve that represents $\overline{z}$ as a function of the wave length (Fig. 2) this result is obtained by making use for instance, for constituting photosensitive mosaic $M_z$, of particles of potassium hydride, and for $E_z$ of a suitable blue filter.

The voltages collected across the terminals of resistances $R_x$, $R_y$, $R_z$ are amplified by tubes $L_x$, $L_y$, $L_z$ so as to obtain, across the terminals of the output resistances $R'_x$, $R'_y$, $R'_z$, voltages proportional to $\Sigma e_{\lambda n} \overline{x}_n$, $\Sigma e_{\lambda n} \overline{y}_n$ and $\Sigma e_{\lambda n} \overline{z}_n$, respectively.

The voltage across the terminals of resistance $R'_y$ is amplified by an amplifier $ay$ the gain of which is adjusted in such manner as to obtain, at the output thereof, a voltage $t = \Sigma e_{\lambda n} y_n$ which represents the luminosity or brightness of the element of the televisioned object that is considered. This voltage $t$ is applied (same as the synchronization signals $\tau$ issued from the synchronization current generator $sy$) to a first modulator $Mt$, also connected to the master oscillator $Os$. Band-pass filter $Fbi$ separates, among the products of modulation, the lower side band of modulation which, after amplification by power amplifier A and after passage through antenna AE, serves to transmit the ordinary television signals (in black and white) including the synchronization signals.

On the other hand, the voltages collected across the terminals of resistances $R'_x$, $R'_y$, $R'_z$ are added together in tube L $(x+y+z)$ and I obtain, across the terminals of resistance $R'$ $(x+y+z)$ at the output of this tube, a voltage proportional to $(\Sigma e_{\lambda n} \overline{x}_n + \Sigma e_{\lambda n} \overline{y}_n + \Sigma e_{\lambda n} \overline{z}_n)$. This last voltage serves to bias the control grids of variable slope tubes $lx$ and $ly$, these grids being, on the other hand, connected with amplifiers $ax$ and $ay$ which supply them respectively with voltages proportional to $\Sigma e_{\lambda n} \overline{x}_n$ and $\Sigma e_{\lambda n} \overline{y}_n$. I therefore obtain, in coils $bx$ and $by$, connected respectively to the plates of tubes $lx$ and $ly$, currents, the intensities of which are proportional to $$x = \frac{\Sigma e_{\lambda n}\bar{x}_n}{\Sigma e_{\lambda n}\bar{x}_n + \Sigma e_{\lambda n}\bar{y}_n + \Sigma e_{\lambda n}\bar{z}_n}$$

$$y = \frac{\Sigma e_{\lambda n}\bar{y}_n}{\Sigma e_{\lambda n}\bar{x}_n + \Sigma e_{\lambda n}\bar{y}_n + \Sigma e_{\lambda n}\bar{z}_n}$$

These currents create magnetic fields which horizontally and vertically deflect the cathode rays beam of oscillograph $o$, the cathode of which is $\gamma$, the control grid is $\mu$, the final anode (metallic coating of the bulb) is $\alpha$, and the fluorescent screen is $fl$. In front of this fluorescent screen $fl$ is placed the graduated transparency screen $e$ made as shown by Fig. 5. Optical system 1 concentrates in photo-electric cell $ph$ the fluorescence light that is allowed to pass by screen $e$. This photoelectric cell is associated with an amplifier, for instance an electron multiplier, as shown by Fig. 6. The electric voltage T obtained across the terminals of the output resistance of photoelectric cell $ph$ characterises both the predominating wave length and the factor of colorimetric purity corresponding to the color of the element of the televisioned object that is considered. This voltage T is applied to a second modulator MT connected to master oscillator Os. The band-pass voltage $Fbs$ separates among the modulation products the upper side band of modulation which, after amplification in power amplifier A, and after passage through antenna AE, serves to transmit the color.

I first adjust the gains of amplifiers $ax$ and $ay$ by means of gauges of known color and luminosity so that the points representing these adjustment colors are suitably positioned on the Maxwell's triangle of the coding screen with respect to the origin P of coordinates (Fig. 5). When this adjustment has been effected, the scenes to be transmitted are recorded, and owing to the variable slope tubes $lx$ and $ly$ the luminous spot on fluorescent screen $fl$ is always given the correct position corresponding to the color of each element of the televisioned object, whatever the brightness of this element. I may also, by means of direct electric voltages supplied by independent batteries, apply a suitable bias on the control grids of tubes $lx$ and $ly$ in such manner that, when any color is transmitted, that is to say when T is equal to zero, the luminous spot on the fluorescent screen $fl$ is located on point E (conventional white) of the graduated transparent screen $e$ instead of being on point P.

The use of two distinct signals utilizing the two side bands of modulation of the same carrier wave and respectively transporting, one the brightness and synchronization signals, and the other the color (predominating wave length and factor of colorimetric purity), has the advantage of permitting the utilization of either ordinary receivers capable of giving only white and black images, or of more expensive receivers capable of giving colored images of a more agreeable appearance. It also permits of inserting black and white texts between two transmissions of colored images, since it is possible, by acting on rheostat $rh$ connected to control grid $\mu$ of cathode ray oscillograph $o$ (Fig. 6) to eliminate all the colored signals T for any desired period. On the other hand, although this transmission of colored images requires a total frequency band which is twice that used for the transmission of black and white images of the same definition (number of image elements transmitted per second), I nevertheless obtain, from the point of view of width of band that is necessary, an important advantage over the three-color systems, which simultaneously transmit three monochromatic images of the televisioned object. Furthermore, these usual three-color systems call for the simultaneous use of at least two different carrier waves, which involves, at the receiving end, difficulties and complications which are avoided with the transmitter of Fig. 6.

Fig. 7 diagrammatically shows the color television receiver, according to my invention. AR is the receiving antenna, A the high frequency amplifier, $Fbi$ and $Fbs$ bandpass filter for respectively separating the lower side band (brightness and synchronization) and the upper side band (predominating radiation and purity). At the output of the first demodulator DM$t$, I obtain the synchronization signals $\tau$ and brightness signals $t$ (black and white television). At the output of the second demodulator DMT, I obtain the color signals T (predominating radiation and purity). The synchronization signals act in the usual manner on the synchronization current generator $sy$, which feeds the horizontal deflecting coil $bh$ and the vertical deflecting coil $by$ that control the cathode rays beams of the receiving oscillograph.

For the sake of clarity, in Fig. 7 the four cathode rays oscillographs with fluorescent screens $On$, $Ob$, $Oj$, $Or$, corresponding respectively to white, blue, yellow and red, and also four objectives $\omega n$, $\omega b$, $\omega j$, $\omega r$ associated therewith, are shown above on another, whereas I actually make use of four oscillographs juxtaposed in such manner that the fluorescent screens occupy the four quadrants of a common circle, or a quadruple cathode rays oscillograph (with four cathode ray beams placed in the same bulb and separated from one another by two partitions of non-magnetic metal at right angles to each other).

It will be hereinafter supposed that the brightness signal $t$ from the transmitting station has a positive polarity when the luminous flux on the mosaic of the iconoscope at the transmitting station increases; whereby an increase of the luminous flux at the transmission end produces an increase of the intensity of the cathode ray beam in the receiving oscillograph and a corresponding increase of the luminosity of the spot on the fluorescent screen.

It will be also supposed that the color signal T from the transmitting station has a positive polarity when the predominating wave length varies in the clockwise direction, starting from violet on the colorimetric diagram of Fig. 1.

The color signal T has, at any time, one of the values indicated in the third line of the table to be found hereinafter, numbers 0, 1, 2, 3 ... 36 corresponding respectively to the portions numbered 0, 1, 2, 3 ... 36 on the graduated transparency screen $e$ (Fig. 5).

In order automatically to deduce from electric voltage T the voltage $Tb$ serving to control the blue, produced by cathode ray oscillograph $Ob$, the voltage $Tj$ serving to control the yellow produced by cathode ray oscillograph $Oj$, the voltage $Tr$ serving to control the red produced by cathode ray oscillograph $Or$, and the voltage $Tp$ serving to control the purity, that is to say the proportion of white produced by cathode ray oscillograph $Op$, I may utilize control means $Cb$, $Cj$, $Cr$ such as shown by Figs. 13, 14a and 15a of my prior U. S. patent above mentioned and a suitable cathode ray switch device, such as shown at CC in Fig. 2 of my French patent of addition No. 49,968 of June 1, 1938.

The variations of Tb, Tj, Tr and Tp, as a function of T, are given by the stepped diagrams of Fig. 8 (see also the following table).

| Wave length in microns | 0.410 | 0.450 | 0.495 | 0.505 | 0.530 |
|---|---|---|---|---|---|
| Color | black or white. | violet, indigo or violet-purple. | blue | green-blue | green. |
| Electric voltage T characterizing the color | 0 | 1 2 3 4 | 5 6 7 8 | 9 10 11 12 | 13 14 15 16 |
| Electric voltage $T_b$ controlling the blue component | 0 | 1 1 1 1 | 2 2 2 2 | 1.5 1.5<br>1.5 1.5 | 1 1 1 1 |
| Electric voltage $T_j$ controlling the yellow component | 0 | 0 0 0 0 | 0 0 0 0 | 0.5 0.5<br>0.5 0.5 | 1 1 1 1 |
| Electric voltage $T_r$ controlling the red component | 0 | 1 1 1 1 | 0 0 0 0 | 0 0 0 0 | 0 0 0 0 |
| Factor of colorimetric purity (mean value) | 0 | 0.5 0.9<br>0.3 0.7 | 0.7 0.3<br>0.9 0.5 | 0.5 0.9<br>0.3 0.7 | 0.7 0.3<br>0.9 0.5 |
| Electric voltage $T_p$ controlling the white | 2 | 1 0<br>1.5 0.5 | 0.5 1.5<br>0 1 | 1 0<br>1.5 0.5 | 0.5 1.5<br>0 1 |

| Wave length in microns | 0.530 | 0.565 | 0.590 | 0.610 | 0.760 |
|---|---|---|---|---|---|
| Color | yellow-green | Yellow | Orange | red or red purple. | mean purple. |
| Electric voltage T characterizing the color | 17 18 19 20 | 21 22 23 24 | 25 26 27 28 | 29 30 31 32 | 33 34 35 36 |
| Electric voltage $T_b$ controlling the blue component | 0.5 0.5<br>0.5 0.5 | 0 0 0 0 | 0 0 0 0 | 0 0 0 0 | 0.5 0.5<br>0.5 0.5 |
| Electric voltage $T_j$ controlling the yellow component | 1.5 1.5<br>1.5 1.5 | 2 2 2 2 | 1 1 1 1 | 0 0 0 0 | 0 0 0 0 |
| Electric voltage $T_r$ controlling the red component | 0 0 0 0 | 0 0 0 0 | 1 1 1 1 | 2 2 2 2 | 1.5 1.5<br>1.5 1.5 |
| Factor of colorimetric purity (mean value) | 0.5 0.9<br>0.3 0.7 | 0.7 0.3<br>0.9 0.5 | 0.5 0.9<br>0.3 0.7 | 0.7 0.3<br>0.9 0.5 | 0.5 0.9<br>0.3 0.7 |
| Electric voltage $T_p$ controlling the white | 1 0<br>1.5 0.5 | 0.5 1.5<br>0 1 | 1 0<br>1.5 0.5 | 0.5 1.5<br>0 1 | 1 0<br>1.5 0.5 |

The curves in dotted lines on Fig. 8 approximately follow these stepped diagrams. Curve OBCD which relates to Tb is obtained by substracting the characteristics EF of a triode from the characteristic in the shape of an inverted bell ABCD of the electronic tube and dry rectifiers systems shown by Fig. 15a of my above-mentioned U. S. A. patent.

Curve IJK which relates to Tj is a "bell shaped" curve such as can also be obtained with a tube and rectifier arrangement shown by Fig. 15a of this prior patent.

Curve OMNPQ which relates to Tr is obtained by substracting from the "inverted bell shaped" curve LMNPR the characteristics ST and UV of two triodes. It is therefore possible to obtain also the curve relating to Tr with a tube and rectifier combination. Finally, the stepped diagram relating to Tp is obtained by means of a cathode ray switch device, as shown at CC in Fig. 2 of my French patent of addition No. 49,968 of June 1, 1938.

Instead of making use of such control devices, I may make use of the quadruple cathode ray switch device, shown at C on Fig. 7, which directly supplies the voltages Tb, Tj, Tr, Tp of Fig. 8.

The working of this cathode ray switch device C is based on the following remark: if in a cathode ray switch device (Fig. 9) including a cathode $\gamma$ and a final anode constituted by several metallic elements $ai$ connected to a common point through resistance $ri$, there is interposed a control grid $\mu$ biased in such manner that the number of electrons passing through this grid increases when the electric voltage $e$ applied to this grid increases, the space between cathode $\gamma$ and the final anode behaves like a conductor, the apparent resistance $\rho$ of which decreases when voltage $t$ increases:

$$\rho = \rho_0[1 - f(t)]$$

$\rho_0$ being a constant and $f(t)$ a function of $t$ which increases when $t$ increases.

When the electronic image of the cathode is on element $ai$ of the final anode, the electric voltage $yi$ collected across the terminals of the external resistance R in series with the source of electromotive force E has substantially the following value:

$$y_i = \frac{ER}{R + \rho_0[1 - f(t)] + ri}$$

By giving resistances $ri$ suitable values, it is therefore possible to adjust at will the values of $yi$ successively obtained (for a given value of $t$) when the cathode ray beam sweeps the various elements $ai$ of the final anode under the effect of a magnetic deflecting field.

The cathode ray switch device C of the color television receiver (shown on Fig. 7) in projection on a vertical plan, includes a rectilinear cathode $\gamma$ (which transmits electrons) a control grid $\mu$ and electronic optical means, only the last element $a$ which is shown on the drawing as being constituted by a conductive coating applied on the inner wall of the bulb C and connected to a metallic end surface. This metallic surface is adapted to cooperate with the cathode ray beam only through the four final anodes $ap$, $ab$, $aj$, $ar$ (Fig. 8a) respectively connected to rheostats $rp$, $rb$, $rj$, $rr$ across the terminals of which are connected voltages $Tp$, $Tb$, $Tj$, $Tr$ applied to the control grids of the cathode ray oscillographs with white, blue, yellow and red fluorescent screens, respectively.

Although these four final anodes are diagrammatically shown by mere vertical lines, they are in fact constituted by four series juxtaposed rectangular metallic elements as shown by Fig. 8a. In each series, these anode elements are connected to a common point by resistances of suitable values. The above mentioned electronic optical device gives a rectilinear electronic image of cathode $\gamma$ in the plan of the four final anodes. For instance, final anode $ab$ includes six metallic elements connected to a common point through resistances $r_1$, $r_2$, $r_3$, $r_4$ of such values that when the control voltage of grid $t$ measured across the terminal of rheostat $rt$ (Fig. 7) is a maximum, that is to say when the element of the televisioned object that is considered has the maximum brightness, the electric voltages collected across the terminals of rheostat $rb$ have the values plotted in ordinate on the stepped diagram $Tb$ (Fig. 8) whereas the color signal T successively assumes the values plotted in abscissas and accordingly the cathode ray beam of C under the action of the magnetic deflecting coil B moves horizontally and sweeps over the series of metallic element of final anode $ab$.

In a likewise manner, anode $aj$ is constituted by five metallic elements corresponding to the five steps of diagram $Tj$. Anode $ar$ is constituted by four metallic elements corresponding to the four steps of diagram $Tr$. The final anode $ap$ is constituted by twenty-four metallic elements corresponding to the twenty-four steps of diagram $Tp$.

Instead of employing, for the final anodes $ap$, $ab$, $aj$, $ar$, metallic elements of negligible electrical resistance connected to a common point through resistances of suitable value (of the same order of magnitude as the apparent internal resistance of the cathode ray switch device) I may make use of "resistant anodes" constituted by thin metallic deposits formed on a plate of non-conducting substance, the various portions of each deposit corresponding to one of the four final anodes having thicknesses proportional to the ordinates of the stepped diagram corresponding to this anode, and the connections of this anode with the corresponding external rheostat leading to the points of maximum ordinates (with the possible insertion of balancing resistances $r_1$, $r_2$ or $r_3$). Such a group of four resistant anodes $ab$, $aj$, $ar$, $ap$ is illustrated by Fig. 10. The numbers written on the various portions of an anode are proportional to the thicknesses of the deposit in these various portions respectively. The connections of the four anodes with the terminals $a'b$, $a'r$, $a'j$ and $a'p$ on the outside of bulb C are also shown on this figure. Such deposits are obtained for instance by successive silverplatings of a thin mica plate, or by successive cathodic precipitations in a vacuum performed on such a plate with a different mask applied for each operation.

When the electronic rectilinear image of the cathode $\gamma$ of the cathode ray switch device C (Fig. 7) sweeps the quadruple anode shown by Fig. 10, the electric voltages collected across the terminals of rheostats $rp$, $rb$, $rj$ and $rr$ have relative values respectively proportional to the ordinates of the dotted line curves of Fig. 8 (curves approximating the stepped diagrams $Tp$, $Tb$, $Tj$, $Tr$).

The above described embodiments are of course given merely by way of example.

Modifications can be made to these embodiments, for instance as follows:

1. If the International Illumination Commission adopts a diagram with rectangular coordinates and a uniform chromatic scale, that is to say a diagram such that the curves of equal factor of purity are circles having as common center the point representing the "spectrum of equal energy" it will be possible accordingly to modify colored screens $E_x$, $E_y$, $E_z$ and the graduated transparency screen $e$ of Fig. 5.

2. On the other hand, it has been above supposed that the fundamental pictural colors (blue, yellow and red) were used for reconstituting the colored image at the television receiving station. It is advantageous to make use of simple colors (blue, yellow and red) that are very pure (highly saturated) because if B, J, R are the points representing these basic colors on the colorimetric diagram, only the colors represented by points located on the inside of triangle BJR or on the sides of this triangle can be obtained by mixing radiations having the basic colors B, J, R respectively. In order to obtain such pure basic colors, I may utilize, at the color television receiving station, a quadruple cathode ray oscillograph having a white fluorescent screen and dispose, opposite the three objectives $\omega_f$, $\omega_j$, $\omega_r$ (Fig. 7), colored filters that permit only the passage of monochromatic blue, yellow, and red radiations, respectively, corresponding to the three representative points B, J, R.

However, I may make use of other combinations of three basic colors for reconstituting the colored image at the receiving station: for instance a green corresponding as closely as possible to the point V=0.520 micron of the curve of saturated colors, a red corresponding as closely as possible to the point R=0.700 micron of said curve, and a blue corresponding as closely as possible to the point B=0.470 of said curve (Fig. 11). In order to determine, for instance, the magnitudes of the luminous fluxes of the two basic colors, to wit green and red, to be mixed together, so as to obtain color $m$ (approximating M on the curve of saturated colors), advantage is taken of the fact that, in the system of rectangular coordinates of the International Illumination Commission, the ordinate $y$ of a point is equal to the "luminosity factor" of the radiation represented by this point.

If I designate by the expression "chromatic flux" the quantity $U = \Sigma e_{\lambda n}\bar{x}_n + \Sigma e_{\lambda n}\bar{y}_n + \Sigma e_{\lambda n}\bar{z}_n$, $\bar{x}_n$, $\bar{y}_n$, and $\bar{z}_n$ being the coefficients of distribution for the excitations of equal energy, the luminous flux is $F = yU$. Point $m$ on line VR (Fig. 11) represents the mixture of the two green and red radiations having respective chromatic fluxes $U_V$ and $U_R$ such that:

$$\overline{mV}.U_V = \overline{mR}.U_R$$

($m$ is the center of gravity of masses $U_V$ and $U_R$ applied at figurative points V and R). The luminous fluxes corresponding to these chromatic fluxes are:

$$F_V = VV' \cdot U_V \text{ and } F_R = RR' \cdot U_R$$

It follows that:

$$\frac{F_V}{F_R} = \frac{\overline{VV'}}{\overline{RR'}} \times \frac{U_V}{U_R} = \frac{\overline{VV'}}{\overline{RR'}} \times \frac{\overline{mR}}{\overline{mV}}$$

Therefore, the green luminous flux $F_V$ and the red luminous flux $F_R$ to be mixed together for obtaining color $m$ (that is to say approximately color M) are proportional to $$\frac{\overline{mR}}{\overline{RR'}} \text{ and } \frac{\overline{mV}}{\overline{VV'}}$$

It is possible, through this graphic method, to obtain the exact values of the ordinates of the diagrams giving the voltages controlling the blue, green and red components as a function of the color signal T, that is to say the curves corresponding respectively to those of Fig. 8 for the chosen blue, green and red colors. In this case, I may utilize for instance, at the receiving station, instead of a quadruple cathode ray oscillograph, four distinct juxtaposed oscillographs $On$, $Ob$, $Ov$, $Or$, having white, blue, green and red fluorescent screens, respectively. The blue fluorescent screen is for instance chiefly constituted by calcium tungstate $CaWO_3$; the green fluorescent screen by zinc silicate $Zn_2SiO_4$, activated by means of manganese; and the red fluorescent screen by magnesium silicate $Mg_2SiO_4$, activated by means of manganese. Suitable screens purify these natural fluorescence colors.

3. The cathode ray switch device C of the television receiver shown by Fig. 7 can be modified by eliminating control grid $\mu$ and inserting, between rheostats $rp$, $rb$, $rj$, $rr$, on the one hand the control grids $gn$, $gb$, $gj$, $gr$ of the cathode ray oscillographs $On$, $Ob$, $Oj$, $Or$, on the other hand, variable slope tubes the grids of which are biased by voltage $t$ (brightness) taken across the terminals of rheostat $rt$.

4. By application of the known methods of construction of iconoscopes, it is possible to devise triple iconoscope I (Fig. 6) in such manner that the three images (either luminous or electronic) of object $Ob$, instead of being side by side, are disposed as follows: two images side by side in the upper semi-circle and the third image below, in the lower semi-circle. This arrangement permits of improving the optical system $\Omega$, $\Omega'$, $\omega_x$, $\omega_y$, $\omega_z$ (Fig. 6) and of facilitating the construction thereof. It is also possible to increase the photoelectric sensitivity of the triple iconoscope I by incorporating therein a preliminary amplification stage by multiplication of electrons.

In the television systems above described, I make use, at the transmitting station, of differential electric means for automatically producing an electric voltage which characterizes the shade or "hue" of the element of the televisioned object that is being scanned at the time that is considered. Such differential electric means include a "coding" device which combines into a single value T, according to a predetermined signalling code, the value of the predominating wave length that characterizes this hue and its degree of saturation $s$ (or its factor of colorimetric purity $p$).

The television receiver, which receives this color signal T in addition to the brightness or luminosity signal $t$ and of the synchronization signal $\tau$ (which are the only signals to be transmitted in the case of black and white television) includes a "decoding" device which automatically deduces from the value of T the modulating voltages of each of the colored lights the luminous beams of which are superposed on the television image receiving projection screen in order to reconstitute the hue of the element of the televisioned object that is being scanned at the same time at the corresponding transmitting station.

If the signalling code that is adopted is very simple, it is possible to make use, for these coding and decoding devices, of arrangements of triodes adapted to add two electric voltages to each other or to substract one voltage from another, as shown by Figs. 4a, 14a and 15a of my prior U. S. Patent No. 2,375,966 already referred to in the preceding description. One of the objects of the present invention is to provide coding and decoding devices for use, in a television system according to the present invention, in the case of a more complicated signalling code. Various embodiments of such coding or decoding devices are shown by Figs. 12 to 16 inclusive of the annexed drawings. On these Figs., O represents the bulb of a cathode ray oscillograph, inside which are mounted the following elements:

An electron transmitting cathode $\gamma$;

An anode $\alpha$ which sets these electrons in movement;

A second anode, not shown on the appended drawings, and constituted by the conducting coating of a portion of the inner wall of bulb O;

A control grid $\mu$ (generally the Wenhelt cylinder) which permits of varying a bias electric voltage which may be applied across the terminals of resistance $r$.

On said Figs. 12 to 16, $b_1$, $b_2$ represent the means for deflecting the cathode rays beam, subjected to the action of electric voltages $t_1$, $t_2$ that are to be combined together according to the signalling code that has been adopted, so as to produce the coded voltage T. Reference characters $b_1$, $b_2$ designate inductance coils creating two orthogonal magnetic fields. Of course, I might also make use of pairs of deflecting plates acting in an electrostatic way on the electrons of the cathode rays beam. Furthermore, the two deflecting actions may be performed in two directions making any angle with each other, not necessarily a right angle.

Owing to the electronic optical system constituted by the above mentioned electrodes and deflecting means, the electronic image $\gamma'$ of cathode $\gamma$ is formed on a surface S at a point the position of which depends upon the values of electric voltages $t_1$ and $t_2$ at the time that is considered.

In the device shown by Fig. 12 (which is used in the television systems illustrated by Figs. 6 and 11 of my above mentioned prior U. S. patent and in the above described annexed Fig. 6), this surface S is constituted by a fluorescent screen $fl$, opposite which is provided a coding screen or "graduated transparency screen" $e$, the various portions of which more or less allow the passage of the fluorescent light produced by the impinging of the electrons of the cathode rays beam on the substance that constitutes fluorescent screen $fl$. Lens $l$ condensates the fluorescence light (which has filtered through screen $e$) onto a photoelectric cell $ph$. At the output of this cell, i. e. across the terminals of resistance R, I collect the coded electrical voltage T the value of which, at a given instant, depends upon the position of the electronic image $\gamma'$ of cathode $\gamma$ on the surface S of fluorescent screen $fl$, and therefore depends upon the values of $t_1$ and $t_2$ at the instant in question. The graduated transparency screen $e$, which is for instance constituted by a white, grey and black drawing traced on a transparent sheet of paper, can easily be made to correspond to a signalling code as complicated as it may be desired. Furthermore, it is easy either to adjust the position of this screen with respect to the cathode ray tube O (which facilitates the adjustment of the differential electric means) or to change at will the coding screen $e$ (which gives a great capacity of adaptation to the coding device of Fig. 12). On the other hand, account must be taken of the fact that all fluorescent substances have a small inertia, although, in the case of tungstates for instance, the persistency is only $10^{-6}$ second. Therefore, this coding or decoding device is not quite suitable to the case of high quality television.

In the device of Fig. 13, the surface S on which the electronic image of cathode is formed is constituted by several sections made of a metallic substance without any substantial electric resistance, called "multiple anodes" $a_1$, $a_2$, $a_3$, respectively connected to various points of a "potential scale" (which is for instance constituted by a battery of elements P) in series with an electrical resistance R. The electric voltage T collected at the terminals of this resistance R at a given instant further depends upon the position on surface S of the electronic image $\gamma'$ of cathode $\gamma$, and therefore depends upon the values of $t_1$ and $t_2$ at the instant that is considered. This cooling device has no appreciable inertia, and only the time of transit of the electrons can limit the rapidity of variation of T. But the construction of tube O is difficult if the number of the multiple electrodes $a_1$, $a_2$, $a_3$, etc. is great, because of the great number of conductors issuing from the bulb of tube O. Consequently, the device of Fig. 13 is not well adapted to the case of a complicated signalling code.

In the device illustrated by Fig. 14 (and which is used in the embodiments of Figs. 7, 8a and 9 above described), the surface S on which the electronic image $\gamma'$ of cathode $\gamma$ is formed is still constituted by a plurality of sections or elements made of a metallic substance without appreciable electric resistance and constituting multiple anodes $a_1$, $a_2$, $a_3$, etc., connected to a common point through resistances $r_1$, $r_2$, $r_3$, etc., provided on the inside of the bulb of cathode ray tube O. This common point is connected to the external resistance R and the battery P. The electric voltage T collected across the terminals of resistance R at a given instant depends upon the value $r_1$ of the resistance connecting element $a_1$ with the common point and consequently upon the values $t_1$ and $r_2$ at this instant. This coding device has no appreciable inertia. The construction of tube O is relatively simple because the number of conductors issuing from tube O is reduced. This coding or decoding device is therefore well adapted to the case of a relatively complicated signalling code.

The same remark applied to the device illustrated by Fig. 15 (which is utilized in particular in the embodiments shown by Fig. 10 above described). In this case, the surface S on which is formed the electric image $\gamma'$ of cathode $\gamma$ is an electric resistance hereinafter called "resistant anode" $ar$ and constituted for instance by a metallic deposit formed on an insulating support. This deposit can be obtained by evaporation, or by cathodic precipitation, or by electrolysis, or again by mechanical projection by means of a spray gun, etc. In order to ensure a stable working of the device, the resistant anode $ar$ should preferably be subjected to a thermal treatment, in order to eliminate all the occluded gases before introducing this resistant anode into bulb O. The electric voltage collected across the terminals of the external resistance R depends upon the electric resistance constituted by the portion of anode $ar$ located between the position of the electronic image $\gamma'$ and the extremity of $ar$ connected to the external resistance R. T therefore depends, in this case also, upon the values of $t_1$ and $t_2$ at the instant that is considered.

The device shown by Fig. 16 is based upon the same principle as that of Fig. 12, but in this case, the electronic image $\gamma'$ of cathode $\gamma$ is no longer transformed into a luminous image, which permits of avoiding the use of a fluorescent substance, introducing a slight inertia. In the embodiment of Fig. 16, I make use of a graduated transparency grid G instead of the graduated transparency screen $e$ of Fig. 12. This grid G is constituted by a metal plate provided with holes $p_1$, $p_2$, $p_3$ etc., of circular shape the centers of which are located at the same distance from one another, this distance being equal to the diameter of the electronic image $\gamma'$ of cathode $\gamma$ which is also supposed to be circular, the radii of these circular holes being of different values (for instance, on Fig. 16, hole $p_1$ is greater than hole $p_2$ which is itself greater than hole $p_3$, and so on). The holes of the graduated transparency grid G may of course be made of a shape other than the circular one. For instance, I may make use of slots of different widths. Alternately, grid G can be made of a metallic cloth the meshes of which are more or less tight-woven according to the respective sections that are considered, such a cloth being thus analogous to a machine made lace, and so on. At a given instant, the electronic image $\gamma'$ of cathode $\gamma$ is formed on this graduated transparency grid G at a place where there is a hole $p_1$, and the number of electrons of this image $\gamma'$ that pass, per unit of time, through grid G and are caught by collecting anode A depends upon the size of this hole $p_1$ and consequently upon the position of the electronic image $\gamma$ on G. In other words, the voltage T collected at the instant that is considered across the terminals of the external resistance R depends upon the values of $t_1$ and $t_2$ at this instant. In order to remedy, if necessary, the perturbing effects of secondary electrons produced by the impinging of the electrons of the cathode rays beam, I may interpose, between grid G and anode A, a grid having very large meshes (the wires of which are disposed behind the solid portions of G) this second grid being kept to a suitable fixed potential for returning the secondary electrons toward the electrode that has emitted them. This second grid has not been shown on the appended drawings.

All the cathode ray tube devices of Figs. 12 to 16 play the same part and can be used for coding or decoding purposes in various embodiments of my invention, the devices of Figs. 14, 15 and 16 being preferable in the case of high quality television, because of the absence of inertia and of the facility of construction of cathode ray tube O.

The voltage $t_1$ (to be combined with voltage $t_2$ in order to obtain coded voltage T) may be, for instance, a function of the wave length of the monochromatic radiation that predominates in the hue of the element of televisioned object that is scanned at the instant that is considered, whereas voltage $t_2$ is a function of the degree of saturation $s$ or of the factor of colorimetric purity $p$ of said hue. As, on the other hand, the working of all the devices shown by Figs. 12 to 16 depends on a third variable, to wit the bias voltage of control $\mu$ (Wenheld cylinder) of cathode ray tube O applied to resistance $r$, it is possible with any of these devices to use a three variable code ($t_1, t_2, t_3$). For instance if I apply to the terminals of resistance $r$ an electric voltage $t$ as a function of the brightness (or luminosity) of the element of televisioned object that is scanned at the instant that is considered while the two other voltages $t_1, t_2$ applied to the deflecting means $b_1, b_2$ are functions of the predominating radiation and of the factor of colorimetric purity of said object element, I obtain across the terminals of resistance R a coded electric voltage T which simultaneously characterizes the brightness, the predominating radiation and the saturation (or colorimetric purity) of this object element. Such a signalling code permits of transmitting a single signal for every element of the televisioned object, which greatly reduces the size of the frequency band necessary for a high quality color television.

The factor of a colorimetric purity $p$ has, over the degree of saturation $s$, the advantage of depending only upon the "conventional white" and "normal eye" that are chosen, and in particular of being independent of the choice of the three "primary excitations" on which the reference system is based. But, on the other hand, the degree of saturation $s$ has, over the factor of colorimetric purity $p$, the advantage of being immediately readable on the colorimetric diagram (Maxwell's triangle). In view of the fact that considerations based on the cost of production of a television receiver permit of employing but a limited number of modulated light sources of different colors (for instance a white source and three colored sources, the colors of which are hereinafter called "basic colors"), it is possible practically to obtain, at the receiving station, by mixing the luminous beams produced by these sources, only the hues represented on the colorimetric diagram by the points located on the inside, or the perimeter, of the triangle, the apexes of which are the points representing the three basic colors. It is, of course, desirable to reduce as much as possible the area of the portions of the colorimetric diagram that are located outside of this triangle. I am thus led to choose as basic colors, as previously stated, three saturated colors (monochromatic radiations) which are respectively blue, grey and red. It may be subsequently decided to normalize the basic colors to be used in the television receiver, and in this case it will be more advantageous to make use of a degree of saturation $s$ as variable instead of the factor of colorimetric purity. I will hereinafter describe an embodiment of my invention making use of Maxwell's triangle, in which I apply the trichromatic system R-G-B, described in 1931 by the International Illumination Commission, slightly modified, in the hypothesis that the normalized basic colors for television receivers are the three primary excitations of said RGB system, to wit a pure red (wave length of 700 millimicrons) a pure green (wave length of 546.1 millimicrons) and a pure blue (wave length of 435.8 millimicrons) and that the conventional white is the "spectrum of equal energy" represented by the center of Maxwell's triangle.

Fig. 17 shows an embodiment of a television transmitter made on the same principle as that illustrated by Fig. 6 but which differs therefrom by the use of a coding device made according to the above-described Fig. 14.

On Fig. 17 can be seen the triode tubes $lx, ly$, the anodic currents of which (flowing through inductance coils $bx, by$) have intensities respectively proportional to $$x = \frac{\Sigma e_{\lambda n} x_n}{\Sigma e_{\lambda n} \bar{x}_n + \Sigma e_{\lambda n} \bar{y}_n + \Sigma e_{\lambda n} \bar{z}_n}$$

$$y = \frac{\Sigma e_{\lambda n} \bar{y}_n}{\Sigma e_{\lambda n} \bar{x}_n + \Sigma e_{\lambda n} \bar{y}_n + \Sigma e_{\lambda n} \bar{z}_n}$$

in which $e_{\lambda n}$ designates the amount of energy transported per second in the form of monochromatic radiation of a wave length equal to $\lambda_n$ by the colored flux emitted by the element of televisioned object that is scanned at the time that is considered, and in which $\bar{x}_n, \bar{y}_n, \bar{z}_n$ are the "coefficients of distribution for excitations of the same energy" corresponding to wave length $\lambda_n$ (decisions of 1931 of the International Illuminations Commission concerning the international trichromatic system X, Y, Z).

The currents flowing through coils $bx, by$ create magnetic fields which, horizontally and vertically deflect the cathode rays beam of tube CT, the electron emitting cathode of which is $\gamma$, the control grid of which is $\mu$ and the second anode of which (the metallic coating of the inner wall of the bulb) is $\alpha$. At one end of the bulb CT are the multiple anodes, $a_0, a_1, a_2, a_3$, etc. connected through resistances $r_0, r_1, r_2, r_3 \ldots$ of different values, to the same external terminal of bulb CT. There are, for instance, thirty-eight anodes which are constituted by metallic pieces which are good conductors of electricity, the shapes of which are identical to the thirty-eight portions into which the Maxwell's triangle (in rectangular coordinates $x$ and $y$) has been decomposed, as shown by Fig. 5 by means of four "lines of equal factor of colorimetric purity" and of nine radii connecting the point that represents the spectrum of equal energy to various points of the "spectrum locus" and of the "line of purples." The Maxwell's triangle thus decomposed into portions is reproduced on the left hand side of the Fig. 17a, with its thirty-eight portions, to wit thirty-six portions designated from $a_1$ to $a_{36}$ corresponding to thirty-six different hues, a central portion designated by $a_0$ and corresponding to white, grey or black, that is to say an absence of color and a peripheral portion designated by $a'_0$. The circuit of battery P and of the external resistance R is closed through the cathode rays beam, between cathode $\gamma$ and that of the anodes $a_1, a_2, a_3 \ldots$ which is struck by the electrons of this cathode rays beam at the time that is considered. This anode depends upon the values of the intensities of the currents flowing through coils $bx, by$ at that time, and therefore upon the trichromatic coordinates $xy$ of the hue of the element of the televisioned object that is being scanned. The values of resistances $r_1, r_2, r_3$ etc., are all different from one another. The resistance $r_n$ connected to anode $a_n$ has been calculated in such manner that the electric voltage T collected across the terminals of resistance R has the value indicated by the signaling code that has been chosen for the hue corresponding to portion $a_n$ of Maxwell's triangle (Fig. 17a).

Resistance R is connected to the control grid of the input tube of modulator MT that produces the color signals. As the capacity between grid and cathode of said input tube is very small, the arrangement of Fig. 17 has a low time constant, and therefore a negligible inertia, although the resistance R is relatively great (comparable to the internal resistance of the cathode ray switch device CT). Instead of connecting the various anodes $a_0$, $a'_0$, $a_1$, etc. to a common external terminal through individual resistances $r_0$, $r_1$ . . . as shown by Fig. 17, it may be more advantageous to connect them to various points of a single resistance $r$, as diagrammatically shown by Fig. 17a. In order to obtain these multiple anodes $a_0$, $a_1$, $a_2$, $a_3$, etc., I may for instance form a metallic deposit on a dielectric support (for instance of mica) the metallic particles of which are removed along the outlines of the various portions of the Maxwell's triangle that is considered, this metallic deposit being made sufficiently thick for having a negligible electric resistance. On the other hand, metallic pieces, connected through rivets with the various portions, respectively, extend between these portions of the metallic deposit, which are electrically insulated from one another, and various points of resistance $r$.

If, instead of the international trichromatic system X, Y, Z recommended by the International Illumination Commission in 1931, another trichromatic system is utilized, it is necessary correspondingly to modify the shapes of the various anodes $a_0$, $a_1$, $a_2$, $a_3$ etc., of the cathode ray switch device DT of Fig. 17 in order to reproduce the relative shapes and positions of the portions into which the new colorimetric diagram that is used has been divided. It is also necessary, in this case, to modify the arrangements of the tubes, such as LX, LY, LZ, L (X+Y+Z) of Fig. 17 that serve automatically to produce electric voltages proportional to the trichromatic coordinates of the hue of the element of the televisioned object that is considered. By way of example, Fig. 17b shows the colorimetric diagram in rectangular coordinates $x$, $y$, $z$, of the "uniform chromatic scale" type proposed by Judd and MacAdam. On this diagram, E represents the spectrum of equal energy and the lines of equal factor of colorimetric purity would be circles of center E.

Instead of utilizing as coding device at the television transmitting station shown by Fig. 17 a cathode ray tube CT of the type shown by Fig. 14, I might make use of a cathode ray tube provided with a graduated transparency grid G and a collecting anode A of the type shown by Fig. 16. This grid G is for instance a fine mesh grid including thirty-six meshes per unit of area (the unit of area being the area of the electronic image $\gamma'$ of the cathode $\gamma$ of cathode ray tube CT in the plane of said grid G). In portion $a_1$ (Fig. 17a) thirty five meshes out of thirty six are filled in every unit of area, while in portion $a_{36}$, the thirty six meshes are empty or free in every unit of area, with intermediate proportions for the respective area portions between $a_1$ and $a_{36}$. Such a graduated transparency grid can be obtained by mechanical punching of a thin sheet of metal in such manner as to cut out in a single operation all the meshes which must be free or empty. It can also be obtained by electrolysis in the following manner: on the two opposed faces of a fine mesh metallic cloth (obtained for instance by interweaving very fine copper wires) patterns are printed or otherwise traced so as to correspond exactly on both sides respectively. For this printing, I may for instance utilize as ink a cellulosic varnish constituting an insulating varnish capable of resisting both pickling and metallic depositing by electrolysis. The portions of the pattern that are covered with varnish are those where the meshes of the grid are to be left empty or free. The structure thus obtained is pickled and electrically scoured, after which it is immersed in an electrolytic copper bath (a strong bath corresponding to at least 25° Baumé) in order to obtain an electrolytic deposit of a sufficient thickness for filling the meshes where there is no protective varnish. The piece is then removed from the electrolytic bath and the cellulosic varnish is dissolved in acetone. If necessary, it will be ascertained, by examination through a magnifying glass, that the meshes that are to be left free are not filled, and any mistake is corrected with a pointed tool.

Finally, the graduated transparency grid G can be obtained by means of an automatic loom of the kind of those used for the mechanical manufacture of laces. This loom, fitted with a Jacquard mechanism, weaves very fine metallic wires; the meshes are more and more tight-woven as one proceeds from portion $a_{36}$ to portion $a_1$ of Fig. 17a.

Figs. 18 to 21b of the appended drawings relate to an embodiment of a television system according to my invention in which the Maxwell's triangle that is used at the transmitting station corresponds to the trichromatic system, with a slight modification. This trichromatic system, described in the proceedings of 1931 of the International Illumination Commission utilizes, as "primary excitations" the three following monochromatic radiations, to wit: red, R, 700 millimicrons; green, G, 546.1 millimicrons; blue, B, 435.8 millimicrons. It will be hereinafter supposed that the objects that are televisioned are illuminated with B standard illuminating means (gaseous atmosphere tube, at a temperature of 2848°, with a filtering tank containing the specified liquids), as recommended by the above mentioned commission, and practically equivalent to the spectrum of equal energy which is taken as conventional white. It will be hereinafter assumed that the four "basic colors" utilized at the corresponding receiving stations also are the three above cited monochromatic radiations and this "conventional white" (equivalent to the spectrum of equal energy). The colorimetric diagram of the R—G—B trichromatic system is shown on Fig. 18 in the form of an equilateral triangle and on the left hand side of Fig. 20a in the form of a right-angled triangle. The apexes B, V, R of the triangle represent the primary excitations, respectively blue, green and red, and point E represents the spectrum of equal energy. Straight line BR is the line of purples and the curve is the "locus of the spectrum" that is to say the geometrical locus of the points representing monochromatic radiations the various wave lengths of which, expressed in millimicrons, are inscribed along this curve. Any point M represents a color the trichromatic coordinates of which are the distances $r$, $v$, $b$ from point M to the three sides BV, RB and VR of the equilateral triangle (Figs. 18 and 18a), the unit that is used being the height of this triangle. Fig. 18b shows that, for a point M located for instance on the inside of triangle BVR, $$Mm_1=b; Mm_2=v; Mm_3=r;$$
$$b+v+r=1Be_1=Ve_2=Re_3$$

If it is admitted that point E represents white, the "predominating radiation" of the "hue" represented by point M is given by the position on the locus of the spectrum of the point of intersection of line EM with this locus (Fig. 18), and the degree of saturation of this hue is immediately given in trichromatic units by ratio EM/ES.

Figure 18:
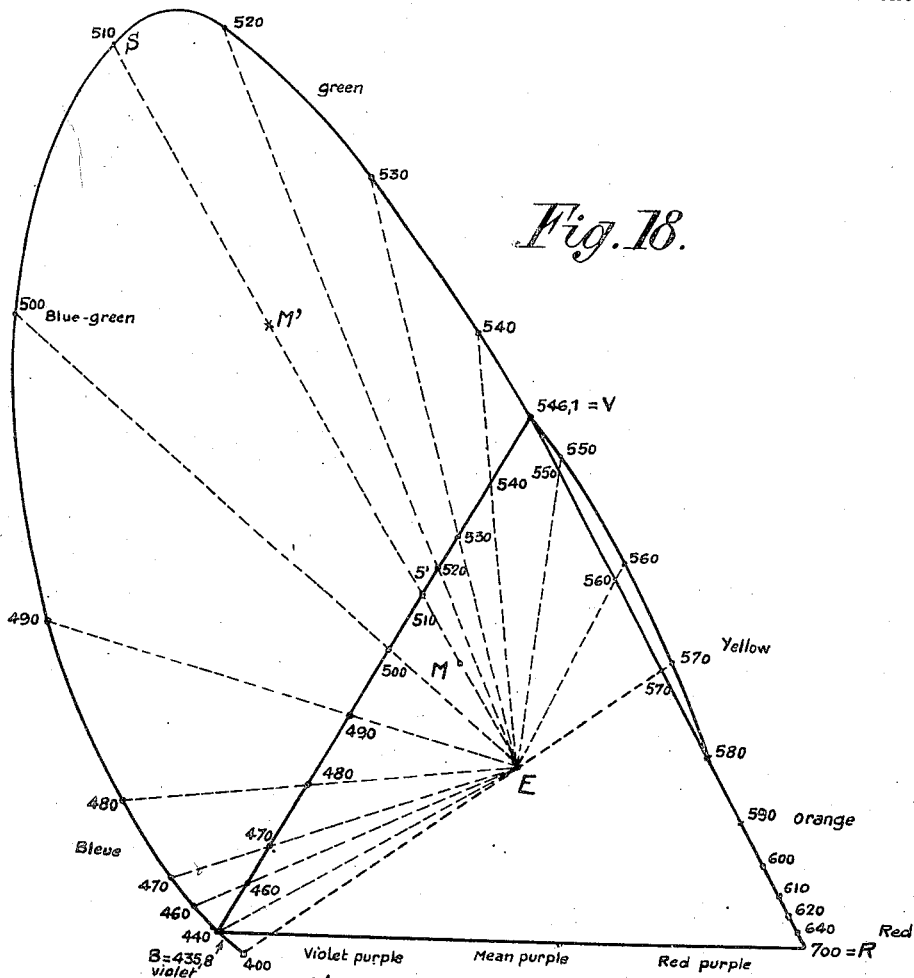
Figure 18B:
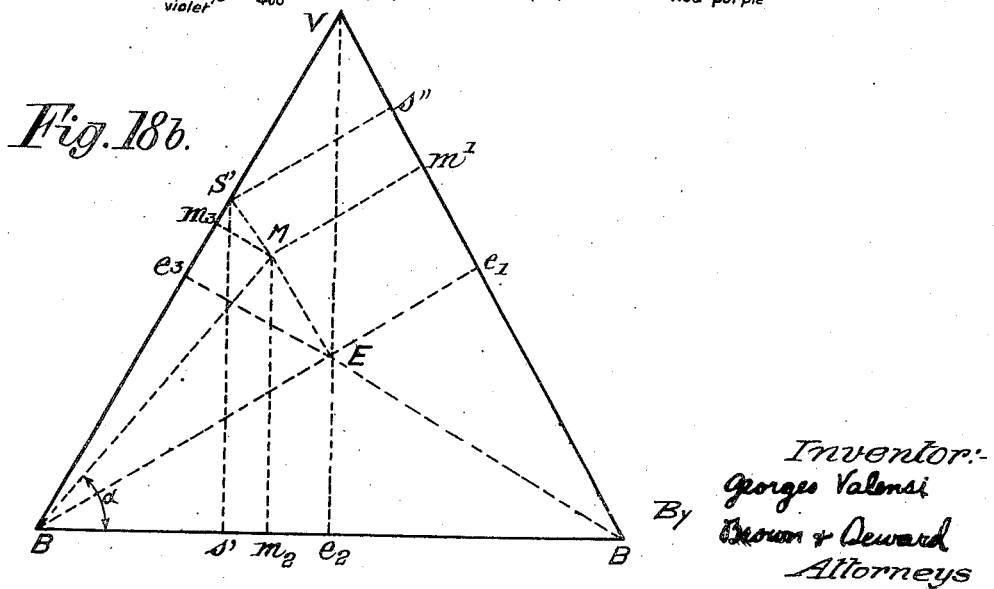

By mixing, at the receiving station, the three above mentioned saturated colors, represented by the apexes BVR of the triangle of Fig. 18, it is possible to obtain but the hues represented by such points M located on the inside of triangle BVR. For all hues represented by points such as M' located on the outside of this triangle, and located on line SS', the most approaching hue that can be obtained is that represented by point S'. It is obtained by mixing only pure blue (435.8 millimicrons) and pure green (546.1 millimicrons) in proportions indicated, in trichromatic units by ratio S'V/S'B. I will hereinafter call "fictive predominating radiation" of the hue represented by point M that of the hue represented by point S'. This leads to replacing the "locus of the spectrum" of Fig. 18 by the sides BV and VR of the corresponding Maxwell's triangle, graduated in wave lengths, as shown by Figs. 18 and 18a. I will hereinafter call "fictive degree of saturation" of the hue represented by point M located on the inside of the triangle the ratio $$\sigma' = \frac{EM}{ES'}$$

By arbitrarily graduating the line of purples BR as shown by Fig. 18a, it is possible to extend to purple colors (represented by points located on the inside of triangle B'ER' and composed of red more or less mixed with white) the above definitions of the "fictive predominating radiation" and the "fictive degree of saturation." The lines of equal fictive degree of saturation are triangles homothetic with triangle BVR with respect to point E.

On the other hand, I deduce from Fig. 18a the proportions in which two of the basic colors are to be mixed in order to obtain a fictive degree of saturation equal to one, that is to say a hue represented by any point of the perimeter of Maxwell's triangle. Fig. 18b shows for instance that color S' is obtained by mixing together S's" trichromatic units of blue B with S's' trichromatic units of green V, since the proportion of blue to green is S'V/S'B and right-angled triangles S'Vs" and S'Bs' are similar. I thus obtain the diagram of Fig. 19 giving in trichromatic units, the proportions $b\lambda$, $v\lambda$, $r\lambda$ (with $b\lambda + v\lambda + r\lambda = 1$) in which the basic colors (blue, green and red) are to be mixed together for obtaining the most saturated colors that can thus be obtained (hue represented by the point marked on the fictive locus of the spectrum, i. e. on one of the sides BV or VR or Maxwell's triangle on Fig. 18a).

If it is supposed now that $e\lambda = f(\lambda)$ is the energetic spectral curve of the colored flux emitted from the element of the televisioned object that is being scanned, it is necessary to determine the corresponding trichromatic coordinates in the system having the three primary excitations that have been chosen, in order to permit, at the television receiving station, of placing the point that represents the hue of this element of object either on the perimeter, or on the inside of triangle BVR (supposing that the locus of the spectrum coincides with the sides BR and VR of this triangle).

For this purpose, it is necessary to determine, for every wave length $\lambda$, the coefficients of distribution for excitations of the same energy $\bar{r}\lambda$, $\bar{v}\lambda$, $\bar{b}\lambda$, which, on the one hand, must be proportional to ordinates $r\lambda$, $v\lambda$, $b\lambda$ of the three curves of Fig. 19 corresponding to abscissa $\lambda$, and, on the other hand, must comply with the condition of luminous fluxes:

$$\bar{r}\lambda L_R + \bar{v}\lambda L_v + \bar{b}\lambda L_B = K\lambda$$

in which $K\lambda$ designates the factor of visibility of the normal eye (reference observer) for radiation $\lambda$, and $L_R$, $L_v$, $L_B$ designate the "factors of luminosity" of the three primary excitations (red, green and blue) that are chosen. Furthermore, the curves representing $r\lambda$, $v\lambda$, $b\lambda$ as a function of $\lambda$ (which curves are not traced on Fig. 19) must, together with the axis of $\lambda$, limit three equal areas, so that the point E representing the spectrum of equal energy is the center of equilateral triangle BVR.

The coefficients of distribution for excitations of the same energy $\bar{r}\lambda$, $\bar{v}\lambda$, $\bar{b}\lambda$ being thus determined (they are always positive), I choose three colored filters having curves of transmission (as a function of the wave length $\lambda$) as close as possible to the three curves that respectively represent the variations (as functions of the wave $\lambda$) of $\bar{r}\lambda$, $\bar{v}\lambda$, and $\bar{b}\lambda$, these filters being designated by reference characters FR, FV and FB.

A television transmitter based on this trichromatic system is shown by Fig. 20. In this fig., Ob is the object that is televisioned, $\Omega$ is an objective, $\Omega'$ is a collecting lens, $\omega_N$, $\omega_B$, $\omega_V$, $\omega_R$ are four objectives giving of object Ob four luminous images juxtaposed on the photoelectric surface Ph of quadruple iconoscope I, through four colored filters FN, FB, FV, FR. It will be hereinafter supposed that the photoelectric sensitivity of surface Ph is uniform for all wave lengths. If this were not the case, it would be necessary to associate with this surface a suitable correcting screen. In this embodiment of my invention, FB, FV, FR are the three above mentioned colored filters having coefficients of transmission $\bar{b}\lambda$, $\bar{v}\lambda$, $\bar{r}\lambda$, respectively, for the monochromatic radiation of wave length $\lambda$. As for filter FN, its coefficient of transmission (corresponding to wave length $\lambda$) is equal to the factor of visibility $K\lambda$ of the normal eye for this radiation. The photoelectric surface Ph associated with "electronic optical means" diagrammatically represented by inductance coil LE acting as "magnetic lens" transforms these four luminous images into four electronic images formed on iconoscope mosaics MN, MB, MV, MR. Across the terminals of the rheostats $r$N, $r$B, $r$V, $r$R located outside of the oconoscope and connected to collecting plates CN, CB, CV, CR, electric voltages are collected with are proportional to quantities $\Sigma e_\lambda K\lambda$, $\Sigma e_\lambda \bar{b}\lambda$, $\Sigma e_\lambda \bar{v}\lambda$, $\Sigma e_\lambda \bar{r}\lambda$, in which $e\lambda$ designates the amount of energy transported per second by the colored flux emitted by the element of the televisioned object to which correspond the homologous points of mosaics MN, MB, MV, MR synchronously scanned by the cathode rays beams issued from the cathodes.

The electric circuit of each rheostat $r$N, $r$B, $r$V or $r$R is closed through battery $p$ and the corresponding cathode rays beam. The four cathode rays beams have been represented on Fig. 20 by dotted lines, it being supposed that photoelectric surface P$h$ is below the beams issued from cathodes ΓB and ΓV. As a matter of fact, the four mosaics MN, MB, MV, MR respectively occupy the four quadrants of a circle instead of being juxtaposed as shown by Fig. 20 in order to permit of seeing certain elements which otherwise would have been hidden by others on this fig. Photoelectric surface P$h$ is optically conjugated with collecting lens Ω' with respect to the plane of objectives ωN, ωB, ωV, ωR. This last mentioned plane is optically conjugated with objective Ω with respect to collecting lens Ω'. Finally, lens Ω' is optically conjugated with the object Ob with respect to Ω. In this way, I obtain a good luminous efficiency and four images of the object Ob substantially from the same point of view.

The electric voltage collected across the terminals of rheostat $r$N is proportional to $\Sigma e_\lambda K_\lambda$, that is to say to the brightness (or luminosity) of the element of televisioned object, whereby, after amplification by means of tube LN, I obtain, across the terminals of resistance $r$N', the electric voltage $t$ which constitutes the "brightness signal," transmitted to the corresponding receiving station together with the synchronizing signal T, as in the case of an ordinary black and white television transmission.

The electric voltages collected across the terminals of rheostats $r$B, $r$V, $r$R are amplified in tubes LB, LV, LR the anodic external resistances $r$B', $r$V', $r$R' of which are mounted in series for acting on the control grid of tube L (B+V+R). At the output of this last mentioned tube, there is collected an electric voltage proportional to $(\Sigma e_\lambda \bar{b}_\lambda + \Sigma e_\lambda \bar{v}_\lambda + \Sigma e_\lambda \bar{r}_\lambda)$ which serves to the simultaneous biasing of the control grids of variable slope tubes $l$r and $l$v. On the other hand, the electric voltages collected at the output of tubes LV and LR (respectively proportional to $\Sigma e_\lambda \bar{v}_\lambda$ and $\Sigma e_\lambda \bar{r}_\lambda$) are transmitted through condensers $k$V and $k$R to the control grids of these two tubes $l$v and $l$r respectively. I obtain, across the terminals of external anodic resistance $r$v'' and $r$r''', electric voltages respectively proportional to the trichromatic coordinates of the hue of the element of televisioned object, to wit:

$$v = \frac{\Sigma e_\lambda \bar{v}_\lambda}{\Sigma e_\lambda \bar{b}_\lambda + \Sigma e_\lambda \bar{v}_\lambda + \Sigma e_\lambda \bar{r}_\lambda}$$

$$r = \frac{\Sigma e_\lambda \bar{r}_\lambda}{\Sigma e_\lambda \bar{b}_\lambda + \Sigma e_\lambda \bar{v}_\lambda + \Sigma e_\lambda \bar{r}_\lambda}$$

The two electric voltages proportional to $v$ and $r$, respectively, thus obtained act on the coding device constituted by cathode ray tube O, which works on the principle illustrated by Fig. 16. In the present case, I employ, as colorimetric diagram the right-angled triangle that is shown on the right hand side of Fig. 20a and which is deduced from the diagram shown on the left hand side of Fig. 20a. The area of this right-angled triangle BVR is divided into twenty portions. The central portion, marked 0, corresponds to white or black (absence of color) and the portions marked from 1 to 20 inclusive correspond to various hues which differ from one another either by the fictive predominating radiation $d$ or by the fictive degree of saturation $\sigma'$. Cathode ray tube O includes an electron emitting cathode C, electronic optical means (not shown) for giving an electronic image of cathode C on the surface of graduated transparency grid G, and a collecting anode A connected with cathode C through a battery P and an external resistance RT across the terminals of which is collected the electric voltage T which constitutes the color coded signal transmitted to the corresponding television receiver. The value of electric voltage T depends upon the number of electrons which pass through grid G and are received by anode A per second. Now, grid G (which corresponds to the triangle on the right hand side of Fig. 20a) is provided, at the center thereof, with a solid triangular portion (corresponding to the central portion 0 of Fig. 20a) whereas the other portions are provided with holes. In every portion, from 1 to 20, of grid G, the ratio of the perforated area to the unperforated area, per unit of area (which unit corresponds to the area of the electronic image of cathode C) is proportional to the number (1, 2, 3 . . . 20) of this portion. On the other hand, at any instant, the electronic image of the cathode occupies on grid G a position (with respect to triangle BVR) which corresponds to the hue of the element of the televisioned object that is being scanned by the cathode rays beams of iconoscope I at this instant, and this for the following reasons:

1. The inductance coil B$r$, the axis of which is parallel to side BV of triangle BVR, is fed with the electric voltage, proportional to $r$ collected at the output of tube $l$r. The magnetic field of this coil therefore gives the cathode rays beam issued from C a deflection at right angles to side BV and of an amplitude proportional to $r$.

2. The inductance coil B$v$, the axis of which is parallel to side BR of triangle BVR, is fed with the electric voltage, proportional to $v$, collected at the output of tube $l$v. The magnetic field produced by this coil B$v$ therefore gives the cathode rays beam issued from C a deflection perpendicular to side BR and of an amplitude proportional to $v$.

The coordinates of the electronic image of cathode C with respect to the right-angled sides of triangle BV are therefore proportional to the trichromatic coordinates $r$, $v$ of the hue of the element of the televisioned object that is being scanned at the instant, and therefore the electric voltage T that is obtained has the value indicated by the fourth line of the following signalling code. This voltage T constitutes the color signal transmitted to the corresponding receiving station.

*Signalling code*

| Wave length in millimicrons of the fictive predominating radiation $d$ | 400 | | | | 490 | | 515 | | 550 | |
|---|---|---|---|---|---|---|---|---|---|---|
| Color of the fictive predominating radiation | black or white. | mean purple. | | violet purple. | | blue | | green-blue | green. | |
| Fictive degree of saturation $\sigma'$ | | 0.50 | 0.75 | 0.75 | 0.50 | 0.50 | 0.75 | 0.75 | 0.50 | 0.50 | 0.75 |
| Coded electric voltage T (color signal) | 0 | 1 | 2 | 3 | 4 | 5 | 6 | 7 | 8 | 9 | 10 |

*Signalling Code—Continued*

| Wave length in millimicrons of the fictive predominating radiation $d$ | 550 | | 565 | | 590 | | 610 | | 700 | |
|---|---|---|---|---|---|---|---|---|---|---|
| Color of the fictive predominating radiation | yellow-green | | yellow | | orange | | red | | red purple | |
| Fictive degree of saturation $\sigma'$ | 0.75 | 0.50 | 0.50 | 0.75 | 0.75 | 0.50 | 0.50 | 0.75 | 0.75 | 0.50 |
| Coded electric voltage T (color signal) | 11 | 12 | 13 | 14 | 15 | 16 | 17 | 18 | 19 | 20 |

The structure of the graduated transparency grid G of the coding device of the television transmitter of Fig. 20 can be simplified by taking into account the following remarks:

If it is supposed, as shown by the appended Fig. 18b, that point M which represents the hue of the televisioned element of the object to be transmitted is located inside triangle BEV, and if this point M is orthogonally projected at $m_2$ on the line of purples BR the middle of which is $e_2$, $a$ being the angle of MB with BR, then:

$$Ve_2 = Re_3 = 1$$

$$Be_2 = \frac{BR}{2} = \frac{2}{\sqrt{3}} \times \frac{1}{2} = \frac{1}{\sqrt{3}}$$

$$e_2m_2 = xBm_2 = Be_2 - e_2m_2 = \frac{1}{\sqrt{3}} - x = Mm_2 \cdot \cotg\alpha = v \cotg\alpha$$

$$Mm_3 = r = BM \cdot \sin(60° - \alpha)$$

$$Mm_2 = BM \cdot \sin\alpha$$

These relations give the following equations:

$$\frac{1}{\sqrt{3}} - x = v \cdot \cotg\alpha$$

$$\frac{v}{r} = \frac{\sin\alpha}{\sin(60° - \alpha)} = \frac{\sin\alpha}{\frac{\sqrt{3}}{2}\cos\alpha - \frac{1}{2}\sin}$$

By eliminating $\alpha$ between these two equations, I obtain:

$$x = \frac{1}{\sqrt{3}}[1 - (2r + v)]$$

As $b + v + r = 1$, this can be written in the following form:

$$x = \frac{1}{\sqrt{3}}(b - r)$$

The same formula is applicable whatever be the position of point M on the inside of triangle BVR if $x = e_2m_2$ is considered as positive when $m_2$ is on the left hand side of $e_2$ (case of $b$ being greater than $r$) and negative when $m_2$ is on the right hand side of $e_2$ (case of $r$ being greater than $b$).

If $d$ is the distance between point $e_2$, i. e. the middle point of the line of purples BR, and point $s'$, i. e. the orthogonal projection of point S' on this line, then:

$$\frac{x}{d} = \frac{e_2m_2}{e_2s'} = \frac{EM}{ES'} = \sigma'$$

(fictive degree of saturation) so that:

$$d = \frac{x}{\sigma'} = \frac{1}{\sqrt{3}} \frac{b - r}{\sigma'}$$

By orthogonally projecting on the line of purples BR the points of the wave length graduation of sides BV and VR of Maxwell's equilateral triangle (that is to say the points of the fictive locus of the spectrum), I therefore obtain, above BR, a "scale of the fictive predominating radiations" of the hues other than the purples. This scale, formed by points such as $s'$, is shown at the bottom of Fig. 18a. I may also trace under BR an arbitrary graduation corresponding to purple hues.

This being done, I obtain the predominating radiation of the hue represented by any point M on the inside of Maxwell's equilateral triangle (Fig. 18a) by tracing a line passing through the center E of this triangle and said point M, and projecting the point of intersection S' of this line with the locus of the fictive spectrum or the line of purples onto said line of purples the middle of which is $e_2$. This projection is $s'$ (of course, in the case of a purple hue, points S' and $s'$ coincide). The predominating radiation is then read on the suitable scale: $d = e_2s'$.

Fig. 20b shows an embodiment of a television transmitter coding device based on the above remarks. This fig., same as Fig. 20, shows the tubes LB, LV, LR and L (B+V+R) for feeding or biasing the grids of variable slope tubes $lb$, $lv$, $lr$. Across the terminals of the external anodic resistances of these last mentioned tubes are collected electrical voltages proportional to the trichromatic coordinates $b$, $v$, $r$ of the hue of the element of object which is televisioned in the trichromatic system above defined, in connection with an equilateral triangle. Fig. 20b also shows two deflecting coils B$b$ and B$r$ associated with cathode ray tube O, but, in this case, the axes of these coils are parallel to sides VR and V$b$ of the equilateral Maxwell's triangle and therefore make an angle of 60° with each other. Furthermore, Fig. 20b shows a pair of deflecting plates P$v$ parallel to side BR of Maxwell's triangle and connected to the terminals of the anodic external resistance of tube $lv$. On the other hand, the graduated transparency grid G of cathode ray tube O, which is shown in front view on the left hand side of Fig. 20c, is merely provided with circular holes the diameters of which are the greater as the distance from the center of equilateral triangle BVR is greater. Behind this graduated transparency grid G are located complementary anodes A₁ and A₂ having, in front view, the respective shapes visible on the right hand side of Fig. 20c. Anode A₁ corresponds to the hexagon B'BVRR'E of Fig. 18a, that is to say to the hues the fictive predominating radiations of which are points of the locus of the fictive spectrum (sides BV and VR of the triangle) whereas anode A₂ corresponds to the triangle B'ER' of Fig. 18a, that is to say to all the hues the fictive predominating radiations of which are purple (portion B'R' of the side BR of Maxwell's triangle). It follows that:

1. The electrons issued from the cathode C of tube O which pass through G strike only that of the pair of anodes A₁, A₂ which corresponds to the portion of Maxwell's triangle (hexagon B'BVRR'E or triangle B'ER') in which is located the point that represents the hue of the element of object that is televisioned; and 2. The number of these electrons, per unit of time, is proportional to the fictive degree of saturation $\sigma'$ of this hue.

I therefore collect, at the output of cathode ray tube O, either an electric voltage $t_1$ across the terminals of rheostat $R_1$ or an electric voltage $t_2$ across the terminals of rheostat $R_2$, these rheostats being respectively connected to anodes $A_1$ and $A_2$ and their circuit being closed through battery P and the cathode rays beam of tube O. Furthermore, this electric voltage ($t_1$ or $t_2$) depends upon the fictive degree of saturation $\sigma'$. These electric voltages $t_1$ and $t_2$ are transmitted through condensers $K_1$ and $K_2$ to the control grids of tubes $l_1$, $l_2$ the anodic external resistances of which are mounted in differential series, and they are transmitted through condensers $K'_1$ and $K'_2$ to the control grids of tubes $11'$ and $12'$ the anodic external resistances of which are assembled in additional series. Therefore, on the one hand I obtain an electric voltage proportional to $(t_1-t_2)$ both in magnitude and in sign, which is applied (in series with a battery of an electromotive force equal to $e$) to the control grid of tube $l\sigma'$. Consequently, I collect across the terminals of the anodic external resistance $r\sigma'$ of tube $l\sigma'$ an electric voltage proportional to $(e+t_1-t_2)$, that is to say higher than $e$ if $t_1$ is higher than $t_2$ (in particular if, $t_2$ being equal to zero, $t_1$ has an appreciable value), and lower than $e$ if $t_1$ is lower than $t_2$ (in particular if, $t_1$ being equal to zero, $t_2$ has an appreciable value). Furthermore, this voltage $(e+t_1-t_2)$ is normally equal (with the difference of a constant value $e$) to the fictive degree of saturation $\sigma'$, since normally one of the components ($t_1$ or $t_2$) is zero while the other is proportional to $\sigma'$. The voltage of value $(e+t_1-t_2)$ is fed to coil $B'\sigma'$, producing the vertical deflection of the cathode rays beam of a second cathode ray tube O' which, in the present case, is the coding tube proper.

On the other hand, I obtain, across the terminals of resistances $r'_1$ and $r'_2$ in series, an electric voltage proportional to $(t_1+t_2)$, of constant sign, and also proportional to the fictive degree of saturation $\sigma'$, since normally one of the components ($t_1$ or $t_2$) is equal to zero while the other is proportional to $\sigma'$. This voltage $(t_1+t_2)$ serves to bias the control grid of a variable slope tube $l_d$. To said grid is applied, on the other hand, by means of condenser $K_3$, an electric voltage proportional to $(b-r)$ collected across the terminals of the anodes of tubes $lb$, $lr$ (Fig. 20$b$). I therefore obtain, across the terminals of the anodic external resistance $rd$ of tube $ld$, an electric voltage proportional to $$\frac{b-r}{\sigma'}$$

that is to say the fictive predominating radiation, as shown by the above remarks made with reference to Figs. 18$a$ and 18$b$. This voltage is applied to coil B$d'$, which produces the horizontal deflection of the cathode rays beam of coding tube O'.

The graduated transparency grid G' of this coding tube O' is shown in front view of Fig. 9$d$. The cross-hatched portions are of solid metal. The other portions, marked from 1 to 20, are provided with holes and the proportion of the perforated area to the unperforated area per unit of area goes increasing from portion 1 to portion 20 (the unit of area being supposed to be equal to the area of the electronic image of cathode C' on the grid G' of tube O'). The portions 1 to 20 of grid G' correspond respectively to the portions 1 to 20 into which the Maxwell's triangle has been decomposed on Fig. 20$a$ (right hand side thereof).

It will be seen that portions 4 and 5 on the one hand 17 and 20 on the other hand project toward the horizontal diameter of grid G', and this for the following reasons: In the case of a hue represented by a point of line EB' of the Maxwell's triangle of Fig. 18$a$ (that is to say of a hue the predominating radiation of which is intermediate between blue and violet purple) or in the case of a hue represented by a point of line ER' (that is to say of a hue the predominating radiation of which is intermediate between red and red purple), the differential electric voltage $(e+t_1-t_2)$ or $(e+t_2-t_1)$ is systematically too small with respect to the fictive degree of saturation because the anodes $A_1$ and $A_2$ of cathode ray tube O (Fig. 20$b$) are (exceptionally) both struck simultaneously by the electrons issuing from cathode C. On the contrary, the sum $(t_1+t_2)$ is truly equal to the fictive degree of saturation $\sigma'$. It follows that, in such a case, the electronic image of cathode C' on the plane of the graduated transparency grid G' of tube O' has the correct abscissa but its ordinate is too small. In order to correct this systematic error, the corresponding portions of grid G' (to wit portions 4, 5, 17 and 20) must therefore be made to project slightly toward the horizontal diameter of said grid).

The advantage of the embodiment of Fig. 20$b$ over that of Fig. 20 is that the graduated transparency grids (as shown by Figs. 20$c$ and 20$d$) are of simpler structure (and therefore easier to obtain by mechanical punching) than the graduated transparency grid of the right hand side of Fig. 20$a$.

Another embodiment (not shown on the appended drawings) of the coding device of the transmitter of Fig. 20 is based upon the following remark:

Fig. 18$b$ shows that:

$$\sigma' = \frac{EM}{ES'} = \frac{ES'-MS'}{ES'} = 1 - \frac{MS'}{ES'} = 1 - \frac{Mm_3}{Ee_3} = 1 - \frac{r}{\frac{1}{3}}$$

and therefore:

$$\sigma' = 1 - 3r$$

In a more general way, the fictive degree of saturation is equal to 1 (that is to say to $b+v+r$) minus three times the smallest of values $b$, $v$ or $r$. On the other hand, it has been shown above that the fictive predominant radiation measured on a suitable scale is equal to:

$$d = \frac{1}{\sqrt{3}} \frac{b-r}{\sigma'}$$

I can therefore replace in the embodiment of Fig. 20$b$ cathode ray tube O by a differential arrangement of triode tubes, as shown by Fig. 4$a$ of my U. S. Patent 2,375,966 of May 15, 1945. This system of triode tubes connected to the output of tubes $lb$, $lv$, $lr$ would automatically give an electric voltage equal to the smallest of quantities $bvr$. Another arrangement of triode tubes with the external anodic resistances in series would, on the other hand, give an electric voltage equal to $b+v+r$. By opposing this last mentioned voltage to the preceding voltage (equal to the smallest of values $b$, $v$, $r$) three times amplified, an electric voltage would be obtained still representing the fictive degree of saturation $\sigma'$ which would be applied to coil B'$\sigma'$ and also to tube $ld$ associated with coding cathode ray tube C' (Fig. 20b). This would permit of obtaining across the terminals of the electric resistance RT the coded color signal (voltage T corresponding to the fictive predominating radiation $d$ and to the fictive degree of saturation $\sigma'$).

Instead of using, for the graduated transparency grid of the coding tube of Fig. 20 or 20b a plurality of elemental areas each of which has a uniform transparency, that is to say instead of having sudden variations of the transparency of this grid, and therefore sudden variations of the electric voltage T, I may provide a transparency that varies gradually and in a continuous manner over the grid along path 1-2-3 . . . 20 (Fig. 20a on the right hand side thereof, or Fig. 20d).

The same gradual variation of the electric voltage T (coded color signal) can be obtained by replacing the coding cathode ray tube O' provided with a graduated transparency G', as shown by Fig. 20b, by a cathode ray tube of the resistant anode type, made on the principle illustrated by Fig. 15. This resistant anode is, for instance, a thin metallic deposit formed on a dielectric support beginning at $a$ and ending at $b$ having the appearance shown by Fig. 20e which has been deduced from Fig. 20d. This resistant anode includes a sinuous portion 1, 2, 3 . . . 17, 18 and a rectilinear portion 19, 20, these two portions being connected together by a metallic wire $f$ of negligible electric resistance. This resistant anode is located behind a metallic screen having the shape of the hatched portions of Fig. 20d. Its end $a$ is connected to the center O of this screen by a metallic conductor of negligible electric resistance while the other end $b$ thereof is connected to resistance RT by a conductor issuing from coding cathode ray tube O' and which is also of negligible electric resistance.

The transformation of the graduated transparency grid shown on the right hand side of Fig. 20a, on the one hand, into the graduated transparency grid shown by Fig. 20d, or into the resistant anode shown by 20e, on the other hand, is an example of representation from one plane to another one, every point of the triangle of the first figure corresponding to a single point of one or the other of the rectangles of the second figure, or inversely. Other similar transformations can be imagined, leading to other embodiments of the coding or decoding devices used in connection with the color television system according to my invention.

Fig. 21 shows the color television receiver corresponding to the transmitter of Fig. 20. The apparatus shown by Fig. 21 differs from that shown by the above-described Fig. 6 only in that use is made, as decoding device C, of a cathode ray tube provided with a graduated transparency grid G working on the principle of Fig. 16 instead of the multiple anode cathode ray tube (working upon the principle of Fig. 14), or instead of a resistant anode cathode ray tube (working on the principle of Fig. 15). The receiver shown by Fig. 21 receives, through its antenna AR connected to amplifier A, on the one hand the brightness signal $t$ and the synchronizing signal $\tau$ from the transmitting station and both transmitted by means of the lower side frequency band corresponding to band pass filter Fbi and to demodulator DMt, and on the other hand the coded color signal T from the transmitting station and transmitted through the upper side band corresponding to band pass filter Fbs and to demodulator DMT. The synchronisation signal $\tau$ acts upon the relaxation oscillation generator $sy$ which feeds the horizontal deflecting coil $bh$ and the vertical deflecting coil $bv$ of the four cathode rays beams contained in four juxtaposed cathode ray oscillographs On, Ob, Ov, Or (or in the four parts of a quadruple cathode ray oscillograph). These cathode rays beams therefore synchronously sweep the four corresponding fluorescent screens: The first fluorescent screen, provided at the bottom end of tube On, constitutes a source of white light which is supposed to be represented by the center E of Maxwell's triangle (Fig. 21a). The second fluorescent screen, located at the bottom of tube Ob transmits a monochromatic blue light owing to the provision of a filter $fb$ which permits the passage of only a narrow band of radiations, the middle of which corresponds to a wave length of 435.8 millimicrons, and this blue light is represented on Fig. 21a by point B. The third fluorescent screen located at the bottom of tube Ov transmits a monochromatic green light owing to the provision of a filter $fv$ which permits the passage of only a narrow band of radiations, the middle of which corresponds to a wave length of 546.1 millimicrons. This green light is shown on Fig. 21a by point V. The fourth fluorescent screen located at the bottom of tube Or transmits a red monochromatic light owing to the provision of filter $fr$ which permits the passage of only a narrow band of radiations, the middle of which corresponds to a wave length of 700 millimicrons, and this red light is represented on Fig. 21a by point R.

At a given instant, the coded color signal T acting through the horizontal deflecting coil B brings the rectilinear electronic image of cathode $\gamma$ on a given vertical of the graduated transparency grid G. This grid G is provided with four holes in the form of horizontal slots, respectively designated by pn, pb, pv, pr and disposed in front of four collecting anodes an, ab, av, ar. To each of these slots corresponds one quarter of the electronic image of cathode $\gamma$. The lower edge of each of these slots is a horizontal line whereas its upper edge is given a special shape which determines, for every point of the slot, the proportion of electrons than can pass through said slots and strike the corresponding collecting anode. For every value of T, the four collecting anodes an, ab, av, ar therefore receive (per unit of time) numbers of electrons that are in predetermined proportions. Consequently, the electric voltages received at the time that is considered across the terminals of rheostats rn, rb, rv, rr (respectively connected with the four collecting anodes an, ab, av, ar) also have predetermined relative proportions. These electric voltages act respectively upon control grids gn, gb, gv, gr (Wenheld cylinders) of the four cathode ray oscillographs On, Ob, Ov, Or, whereby, in each of these oscillographs, the intensity of the cathode rays beam is the greater as the voltage collected across the terminals of the corresponding rheostat is higher. The electric powers received, at the time that is being considered, by the four fluorescent screens are proportional to the apertures of the four slots of the graduated transparency grid G along the vertical upon which the coded signal T has brought the rectilinear electronic image of cathode $\gamma$, and these electric powers are transmitted, by fluorescence, into colored lights (respectively white, blue, green and red) the fluxes of which are superposed (through the optical system constituted by objectives $\omega_n$, $\omega_b$, $\omega_v$, $\omega_r$, $\Omega$ and the collecting lens $\Omega'$ on the projection screen EP at a point that corresponds to the position (on the televisioned object) of the element that is being scanned at the same time at the corresponding transmitter.

The faithful reproduction of the hue of this element is insured owing the predetermined relative proportions of the widths of the slots of grid G. The brightness of this element is also faithfully reproduced because the total amount of electrons striking graduated transparency grid G (and therefore the total power of the four luminous sources $On$, $Ob$, $Ov$, $Or$ at the time that is being considered) is adjusted by signal $t$ (brightness or luminosity signal) acting upon the control grid $\mu$ of the decoding device C.

In order to determine the outlines of the upper edges of slots $pn$, $pb$, $pv$, $pr$ of graduated transparency grid G, I proceed as follows:

In order to have the ordinates of the points of these four outlines that have the same abscissa corresponding to a given value T of the coded color signal, reference is had to the above signaling code which gives the fictive predominating radiation $d$ and the fictive degree of saturation $\sigma'$ that corresponds to this value T. It is therefore possible to place on the Maxwell's triangle of Fig. 21a, the point corresponding to this predominating radiation $d$ on the scale of line BR (point $s'_1$ for instance) and to obtain on the locus of the fictive spectrum the corresponding point $s'_1$ which represents the fictive predominating radiation. A point $M_1$ is then taken on line $ES'_1$ which divides this segment in the proportion $$\frac{EM_1}{ES_1}=\sigma'$$

Point $M_1$ represents the hue to be reproduced by mixing the four available luminous fluxes (sources $On$, $Ob$, $Ov$, $Or$). If the point thus obtained is inside quadrilateral BB'EV (for instance as shown for point $M_1$ by Fig. 21a) the hue to be reproduced is obtained by a suitable mixing of the fluxes from white source $On$, blue source $Ob$, and green source $Ov$. If the point that is obtained is inside quadrilateral VER'R (for instance point $M_2$ on Fig. 21a) the hue to be reproduced is obtained by suitable mixing of the white, green and red sources respectively $On$, $Ov$ and $Or$. Finally, if the point that is obtained is located inside triangle REB (for instance point $M_3$ on Fig. 21a) the hue to be reproduced is obtained by a suitable mixing of the fluxes from the white, red and blue sources respectively $On$, $Or$, $Ob$.

By way of example, I will now consider the first case above mentioned (point $M_1$ of Fig. 21a).

The hue to be reproduced is a green very close to blue-green with a fictive degree of saturation $$\sigma'=\frac{EM_1}{ES'_1}$$

Since points E, $M_1$ and $S'_1$ are located on a common straight line, it is deduced that hue $M_1$ is a mixture of white E and color $S'_1$ in proportions given by the symbolic relation:

$$M_1=E\left(\frac{M_1S'_1}{ES'_1}\right)+S'_1\left(\frac{M_1E}{ES'_1}\right)$$

In a likewise manner, hue $S'_1$ is a mixture of blue B and green V in proportions given by the symbolic relation:

$$S'_1=B\left(\frac{S'_1V}{BV}\right)+V\left(\frac{S'_1B}{BV}\right)$$

therefore $$M_1=E\left(\frac{M_1S'_1}{ES_1}\right)+\frac{M_1E}{ES'_1}B\left(\frac{S'_1V}{BV}\right)+V\left(\frac{S'_1B}{BV}\right).$$

The desired proportions, given in trichromatic units are therefore $$e_0=\frac{M_1S'_1}{ES'_1} \text{ trichromatic unit of white E}$$

$$b_0=\frac{S'_1V}{BV}\times\frac{M_1E}{ES'_1} \text{ trichromatic unit of blue B}$$

$$v_0=\frac{S'_1B}{BV}\times\frac{M_1E}{ES'_1} \text{ trichromatic unit of green V}$$

As the brightness is separately adjusted by the action of the control grid $\mu$ of cathode ray tube C (Fig. 21), the problem is merely to obtain a unitary luminous flux (one lumen) from the mixing of these three colors E, B, V. In order to transform the above proportions (in trichromatic units) into corresponding values given in lumens, the three above expressions must be multiplied by the luminosity factors LE, LB, LV of white, blue and green, respectively.

As conventional white corresponds to the center of Maxwell's triangle, the coordinates of which are ⅓, ⅓ and ⅓, if LR is the luminosity factor of red, I have:

$$L_E=\frac{1}{3}(L_B+L_V+L_R)$$

Furthermore, as it is desired to obtain one lumen from the mixing of the three white, blue and green colors, it is necessary to divide the numbers thus obtained by their sum. I thus obtain the new following expressions:

$$e_1=\frac{e_0L_E}{e_0L_E+b_0L_B+v_0L_V}$$

$$b_1=\frac{b_0L_B}{e_0L_E+b_0L_B+v_0L_V}$$

$$v_1=\frac{v_0L_V}{e_0L_E+b_0L_B+v_0L_V}$$

Finally, there remain to take into account the electro-optical efficiencies of the various oscillographs, which are designated as follows:

$\rho_E$ for cathode ray oscillograph $On$;

$\rho_B$ for cathode ray oscillograph $Ob$, associated with filter $fb$; and $\rho_V$ for cathode ray oscillograph $Ov$, associated with filter $fv$.

These efficiencies are given in lumens per watt. In other words, if the electrons that strike the fluorescent screen of $Ob$ convey thereto an electric power of one watt, the luminous flux issuing from filter $fb$ is equal to $\rho_B$ lumen.

Finally, the proportions (in watts) according to which the energy transported per second by the electrons of the cathode rays beam of tube C between the three slots $pn$, $pb$, $pv$ at the points in question the common abscissa corresponds to T are:

$$\frac{e_1}{\rho_E}, \frac{b_1}{\rho_B} \text{ and } \frac{v_1}{\rho_V}$$

Therefore, the widths of slots $pn$, $pb$, $pv$ at these points of common abscissa corresponding to T must have relative proportions as given by these last expressions. As for slot $pr$, it is filled at the point of abscissa corresponding to voltage T, i. e. there is on the graduated transparency grid G a solid portion at this point of said slot $pr$, since no red color component is necessary for composing the desired hue (represented by point $M_1$ of Fig. 21a and corresponding to the value of T that is being considered).

The hue represented by point $M_1$ on Fig. 21a might quite as well be obtained by a mixture in suitable properties of the three sources, respectively blue, green and red, which would make it possible to dispense with cathode ray oscillograph On, provided with a white fluorescent screen (Fig. 21). But then, in the case of an unsaturated hue (that is to say in the case by far the most usual in practice) three important portions of the light fluxes transmitted by oscillographs Ob, Ov, Or would serve merely to reconstitute white. Now, the presence of filters fb, fv and fr greatly reduces the efficiency of the blue, green and red light sources of Fig. 21 with respect to the electro-optical efficiency of the fluorescent screens considered separately. When the four cathode ray oscillograph On, Ob, Ov, Or of Fig. 21 are utilized, the blue, green and red sources, respectively Ob, Ov, and Or act merely by adding colors to a black and white image supplied by oscillograph On, which is not provided with a filter whereby the whole of its electro-optical efficiency is utilized. Furthermore, the arrangement of Fig. 21 permits of easily shifting from colored television reception to the reception of black and white images, by merely operating a switch (not shown on the drawing) which, on the one hand, disconnects $rt$ from $\gamma\mu$ and $rn$ from $\gamma_n g_n$, and, on the other hand, connects $rt$ with $\gamma_n g_n$, while cutting off the heating circuit of cathode $\gamma$.

Fig. 21b shows a modification of the color television system receiver according to which, instead of making use of blue, green and red fluorescent sources (necessarily giving a limited amount of light since the resistance of the fluorescent substances to a violent electronic bombardment is itself limited) I make use of a powerful source of white light s (for instance an electric arc) the rays of which pass first through the crystalline screen Ec of a Scophony Skiatron tube with three cathode rays beams, and then through three colored filters fb, fv, fr permitting only a narrow band of radiations to pass therethrough, the middle points of these bands corresponding respectively to 435.8 millimicrons for fb, 546.1 millimicrons for fv, and 700 millimicrons for fr.

The crystalline screen Ec is constituted by a mosaic of small crystals of an alkaline halogenide (sylvine for instance) subjected to the electric field produced by battery p and also subjected to the electronic bombardment of the three cathode rays beams which synchronously scan the three complementary and juxtaposed portions of said crystalline screen Ec. These crystals have the property of becoming the more opaque as the cathode rays beam that strikes them is more intensive, this opacity lasting but for a small time interval which is a function both of the electric field to which are subjected these crystals and of their temperature.

It will be hereinafter supposed that point $M_2$ of Fig. 21a represents the hue of the element of the object that is being televisioned, while the center E of Maxwell's triangle represents the white light supplied by source s (this light being reflected by spherical mirror m and condensed on screen Ec by lens c, the luminous rays being, on Fig. 21b, represented by dash-and-dot lines while the cathode rays beams are represented by dotted lines, two of the cathode rays beams being laterally directed, while the third one comes from below). Since point E is at equal distance from the apexes BVR of Maxwell's triangle, which respectively represent monochromatic blue, green and red radiations, of wave lengths respectively equal to 435.8, 546.1 and 700 millimicrons, this means that one third of blue, one third of green and one third of red in monochromatic units are necessary for reproducing white, i. e. $\frac{1}{3}LB$, $\frac{1}{3}LV$, $\frac{1}{3}LR$ lumens of these three components respectively, if LB, LV, LR designate their respective luminosity factors.

When a white, grey, or black element of the object that is being televisioned is scanned, the coded voltage color signal applied to the coil that deflects the cathode rays beam of the decoding tube is zero. At the corresponding place on the graduated transparency grid, slots pb, pv, pr must have their minimum widths, and these widths must be determined in such manner that, with polarizations $\pi_b$, $\pi_v$, $\pi_r$ of the control grids $gb$, $gv$, $gr$ of the three cathode rays beams of oscillographs Ob, Ov, Or, the darkenings of blue, green and red are obtained that correspond to the proportions of light issuing from filters fb, fv, fr that are necessary for obtaining one lumen of white light on projection screen EP.

Furthermore, the brightness signal $t$ must be applied to the control grid of the decoding tube with a polarity such that the intensity of the cathode rays beam is maximum when $t$ is small (case of a black element of the televisioned object) since the greater the intensity of the cathode rays beam of the decoding tube, the more opaque are the crystals of screen Ec to the light from source s.

If, now, any other value of the color coded signal T is considered, corresponding for instance to point $M_2$ in the Maxwell's triangle of Fig. 21a, it is necessary, in order to reproduce this hue $M_2$, to mix an amount of red proportional to $$\frac{M_2 c}{cR}$$

and an amount of the color represented by point c proportional to $$\frac{cV}{BV}$$

This color c is itself obtained by mixing $$\frac{cV}{BV}$$

of blue B and $$\frac{cB}{BV}$$

of green V. Therefore, the hue represented by point $M_2$ is finally obtained by mixing together the following proportions of blue, green and red:

$$b = \frac{M_2 R}{cR} \times \frac{cV}{BV} \text{ trichromatic units of blue;}$$

$$v = \frac{M_2 R}{cR} \times \frac{cB}{BV} \text{ trichromatic units of green;}$$

and $$r = \frac{M_2 c}{cR} \text{ trichromatic units of red}$$

In order to obtain one lumen of the hue represented by point $M_2$, it is therefore necessary to mix together the following fractions of a lumen of blue, green and red lights, respectively:

$$b' = \frac{bL_B}{bL_B + vL_V + rL_R} \text{ lumen of blue}$$

$$v' = \frac{vL_V}{bL_B + vL_V + rL_R} \text{ lumen of green}$$

$$r' = \frac{rL_R}{bL_B + vL_V + rL_R} \text{ lumen of red}$$

Therefore, with respect to the proportions $b_0$, $v_0$, $r_0$ of the three basic colors that are projected when the color signal T is zero (case of white, grey or black), it is necessary, when the color signal has a value T greater than zero and corresponding to the hue represented by point $M_2$, to produce supplementary darkenings (of the crystals of screen $E_c$ located in front of points homologous of colored filters $fb$, $fv$, $fr$) respectively equal to:

$$(b_0-b'), (v_0-v'), (r_0-r')$$

The electric voltages to be applied to the control grids $gb$, $gv$ and $gr$ of oscillographs $Ob$, $Ov$, $Or$ for producing the desired darkenings must be increased, with reference to the values corresponding to white, grey or black, in proportions corresponding to $(b_0-b')$, $(v_0-v')$ and $(r_0-r')$.

Therefore, at the points of common abscissa corresponding to the value of electric voltage T that is considered, the widths of the slots $pb$, $pv$, $pr$ of graduated transparency grid G must be correspondingly increased with reference to the minimum widths that these slots have respectively at the points the common abscissa of which corresponds to $T=0$, i. e. to a white, a grey or a black. I thus determine, point by point, the outlines of the upper edges of these slots, the lower edges of which are supposed to be rectilinear.

Figs. 22 to 23a relate to another embodiment of a color television transmitter according to my invention. According to this embodiment, I make use, as colorimetric diagram, instead of Maxwell's triangle, of Newton's circle of colors, as shown by Fig. 22. Dividing the white light spectrum into seven sections, called "homochromatic lights" (violet, indigo, blue, green, yellow, orange and red) Newton experimentally determined what proportions of every homochromatic light can mutually replace one another in artificial mixtures for producing the same sensation on the eye. Designating the total intensity of white light by number 658⅓, he found that the respective intensities of these seven homochromatic divisions were characterized, in their equivalent ratios, by numbers $$\frac{1000}{9}=111\tfrac{1}{9}$$

for violet, green and red $$\frac{1000}{10}=100$$

for blue and yellow $$\frac{1000}{16}=62\tfrac{1}{2}$$

for indigo and orange. He therefore traced a circle the circumference of which represents number 658⅓ and allotted to the respective homochromatic lights circumferential arcs respectively proportional to the above numbers, thus obtaining a circular diagram such as that shown by Fig. 22. From the center C of this circle, are traced a plurality, leading each to the middle of the arc corresponding to each homochromatic light and on each of these radii is marked the center of gravity of this arc, which gives points U, I, B, V, J, O, R. If, at these respective points, are placed weights equal to 111⅑ at U, 62½ at I, 100 at B, 111⅑ at V, 100 at J, 62½ at O, and 111⅑ at R, these points representing amounts of homochromatic lights, the center of gravity of the system is at the center C of the circle, which corresponds to white. If, at these respective points, are placed weights corresponding to the amounts of homochromatic lights into which the spectrum of the colored flux transmitted from any element of a televisioned object has been decomposed, the center of gravity of these weights is located in a given sector of Newton's circle. The spectral color (violet, indigo, blue, green, yellow, orange or red) corresponding to this sector indicates the predominating radiation of the hue of the element of the object that is being considered. Furthermore, if the distance of this center of gravity from center C is equal to $\delta$, the sensation produced by this hue is comparable to that which would be obtained by mixing this predominating spectral color with white light in the ratio of $\delta$ to $(1-\delta)$. This is Newton's rule, such as it was expressed by Biot in the following formula which gives the coordinates $x$, $y$ of the point representing a hue the homochromatic components of which are U (violet), I (indigo), B (blue), V (green), J (yellow), O (orange), and R (red), the radius of Newton's circle being taken as unit of length:

$$x=\frac{(R+U)\times 0.823+(O+I)\times 0.207-(J+B)\times 0.514-V\times 0.954}{R+O+J+V+B+I+U}$$

$$y=\frac{(R-U)\times 0.482+(O-I)\times 0.963+(J-B)\times 0.814}{R+O+J+V+B+I+U}$$

In a television transmitter, according to the invention, and making use of Newton's circle as colorimetric diagram, two different constructions are possible for the differential electric arrangement which produces the electric voltage T which indicates the hue of televisioned element that is being scanned.

The first construction, which is not shown on the drawings, would consist (in a similar manner to what has been shown by the above described Fig. 6) in associating, with vacuum tubes for amplifying electric voltages R, O, J, V, B, I, U (proportional to the homochromatic components of the hue of the televisioned element, separated from one another by a spectograph onto which is directed the colored flux transmitted by said element) the following means: 1°—Other vacuum tubes producing "sum-voltages" $(R+U)$, $(O+I)$, $(J+B)$ and $(R+O+J+V+B+I+U)$ and also "difference-voltages" $(R-U)$, $(O-I)$, $(J-B)$; 2°—Two vacuum tubes $lx$, $ly$ (variable slope amplifying tubes) the control grids of which would be suitably connected with the plates of the preceding tubes and which would automatically produce across the terminals of the anodic external resistances of said tubes, two voltages respectively proportional to the values $x$ and $y$ given by above Biot's formula. (This group of vacuum tubes would therefore automatically perform the calculations indicated by these formulas). The two voltages, respectively proportional to $x$, $y$ thus obtained, would act in two rectangular directions on the cathode rays beam of a coding tube working for instance on the principle illustrated by Fig. 14 (multiple anode tube) or according to the principle illustrated by Fig. 16 (graduated transparency grid tube). Across the terminals of the external resistance R of this coding tube would be obtained the electric voltage T characterizing the hue of the element that is being scanned.

The second construction of the differential electric arrangement for automatically producing this electric voltage T is based upon the following remark:

In Newton's colorimetric diagram (Fig. 22), radius CU is perpendicular to radius CB and radius CJ is perpendicular to radius CR. Now, in a cathode ray tube OC (Fig. 23), the cathode ray beam of which is perpendicular to plane of Fig. 22 at point C, I provide, four inductance coils around this tube so as to act as electromagnetic deflecting means, to wit DR having its axis along CJ, DH having its axis along CR, DB having its axis along CU and DU having its axis along CB. On the other hand, I provide, inside this cathode ray tube, four pairs of plates parallel between them, two by two, and all of them perpendicular to the plane of Fig. 22, acting as electrostatic deflecting means, to wit two plates DO, DO' (Fig. 22) perpendicular to CO, two plates DI, DI' perpendicular to CI, and two plates DV, DV' perpendicular to CV. Finally, I apply to these deflecting means the following electric voltages, to wit:

$$u = \frac{U}{U+I+B+V+J+O+R} \text{ for coil DU}$$

$$i = \frac{I}{U+I+B+V+J+O+R} \text{ for plates DI, DI'}$$

$$b = \frac{B}{U+I+B+V+J+O+R} \text{ for coil DB}$$

$$v = \frac{V}{U+I+B+V+J+O+R} \text{ for plates DV, DV'}$$

$$j = \frac{J}{U+I+B+V+J+O+R} \text{ for coil DJ}$$

$$o = \frac{O}{U+I+B+V+J+O+R} \text{ for plates DO, DO'}$$

$$r = \frac{R}{U+I+B+V+J+O+R} \text{ for coil DR}$$

Under these conditions, the cathode ray beam is deflected through the action of these deflecting means as if forces were applied to points U, I, B, V, J, O, R of Newton's circle with respective intensities proportional to $u, i, b, v, j, o, r$. At the end of the bulb of cathode ray tube OC I place a graduated transparency grid G including, for instance, thirty-six elemental areas (Fig. 22a), the central elemental area designated by O being a solid metallic part and the other areas designated by numbers 1 to 26 respectively, having, per unit of area, a ratio of perforated area to unperforated area that increases from elemental area 1 to elemental area 26. On a collecting anode A located behind this grid G, I collect, per unit of time, a number of electrons proportional to the reference number of the elemental area of grid G on which the electronic image of cathode γ of tube OC has been formed at the time that is being considered. This number of electrons therefore characterizes the hue of the colored flux, the violet, indigo, blue, green, yellow, orange and red components of which are respectively proportion to $u, i, b, v, j, o, r$ (it will be supposed that the above mentioned unit of area is chosen for the graduated transparency grid G is equal to the area of the electronic image of this cathode γ).

The television transmitter working on this principle is diagrammatically shown on Fig. 12. Ob is the televisioned object which is supposed to be a vertical plane. I is a double iconoscope supposed to be placed vertically in a camera the section of which is shown by the cross-hatched frame Ca. The upper horizontal face of this camera is provided with a narrow slot F for a spectrograph diagrammatically represented by lens $\omega'_2$, prism S and an objective $\omega'_1$. The optical system constituted by objective $\Omega$, the collecting lens $\Omega'$, the objective $\omega_1$, total reflexion prism $p$ and objective $\omega'_1$, forms a first luminous image of object Ob on photoelectric surface $Ph_1$. In this image, the horizontal lines of object Ob are reproduced by lines perpendicular to the plane of Fig. 23 whereas the vertical lines of this object are reproduced by straight lines parallel to the intersection of this photoelectric surface $Ph_1$ with the plane of Fig. 23. On the other hand, the optical system constituted by objective $\Omega$, collecting lens $\Omega'$, objective $\omega_2$ and revolving mirror $mt$ (the axis of which is perpendicular, at $\alpha$, to the plane of Fig. 23) gives a second luminous image of object Ob on the horizontal upper face of camera Ca. At a given time, the image of a given horizontal line of object Ob coincides with slot F. When mirror $mt$ revolves about its axis $\alpha$, being driven by an electric motor M diagrammatically shown on Fig. 23 by a circle having its center at $\alpha$ the images of the various horizontal line of object Ob pass successively on slot F. The spectrograph spreads on photoelectric surface $Ph_2$ the spectrums of the lights emitted by the various points of the horizontal line of object Ob the image of which coincides with slot F. The violet radiations, which undergo the maximum refraction, come on the right hand side of $Ph_2$, while the red radiations, which undergo the minimum refraction, come on the left hand side. $Ph_2$ is optically conjugated with the horizontal plane that contains slot F with respect to optical systems $\omega'_2\delta$ of the spectrograph. The plane which contains F is optically conjugated with collecting lens $\Omega'$ with reference to rotating mirror $mt$ and objective $\omega_2$. $Ph_1$ is optically conjugated with collecting lens $\Omega'$ with reference to objectives $\omega_1$, $\omega'_1$ and prism $p$; the plane of objectives $\omega_1$, $\omega_2$ is optically conjugated with $\Omega$ with reference to $\Omega'$. Finally $\Omega$ is optically conjugated with Ob with reference to objective $\Omega$.

Photoelectric surfaces $Ph_1$, $Ph_2$ (associated with electronic optical means diagrammatically shown by coil LE which act as a "magnetic lens") transform the luminous images of object Ob on $Ph_1$ and of the juxtaposed spectrums of the lights of the various points of the horizontal line of object Ob on $Ph_2$ into two electronic images formed on iconoscope mosaics $M_1$ and $M_2$ respectively. These mosaics are synchronously scanned by cathode ray beam issued from cathode $\Gamma_1$ and $\Gamma_2$. Cathode $\Gamma_1$ is punctiform and gives on $M_1$ a punctual scanning spot displaced by the magnetic field of coils $Bl_1$, $bi_1$ at the line changing frequency $fl$ and at the image changing frequency $fi$ (these two frequencies $fl$ and $fi$ being generated by a group of relaxation oscillators $sy$). Cathode $\Gamma_2$ is of thread-like shape and gives on $M_2$ a rectilinear scanning spot (parallel to the plane of Fig. 23), and therefore covering the whole of the spectrum of the light emitted by the televisioned element that is being scanned at the time that is being considered. This rectilinear scanning spot moves (from front to rear in the plane of Fig. 23 with a sudden return to the front for every change of scanning line) under the action of the magnetic field of coil $bl_2$ fed by generator $sy$ with the electric current of a frequency $fl$. The same generator synchronizes, by means of the image changing frequency $fi$, electric motor M that drives revolving mirror $mt$ by acting upon a small synchronous motor, not shown, and keyed on the shaft $\alpha$ of motor M. It will be supposed that correcting screen $E_1$, which is associated with surface $Ph_1$ gives said surface a curve of photoelectric sensitivity identical to curve of visibility of the normal eye. Accordingly, at a given time, I collect, across the terminals of rheostat $Rt$ connected to collecting plate $C_1$ associated with iconoscope mosaic $M_1$, an electric voltage $t$ proportional to the brightness or luminosity of the element $Ob$ of the object that is being scanned. This voltage $t$ constitutes the brightness signal transmitted to the corresponding receiver simultaneously with a synchronisation signal. It will be supposed that correcting screen $E_2$ associated with photoelectric surface $Ph_2$ gives the latter a photoelectric sensitivity characteristic that is uniform for all radiations. I therefore collect, at the time that is being considered, across the terminals of the rheostat RU, RI, RB, RV, RJ, RO and RR (connected with the collecting plates $c_2u$, $c_2i$, $c_2b$, $c_2v$, $c_2j$, $c_2o$ and $c_2r$ associated with the various parts of iconoscope mosaic $M_2$) electric voltages U, I, B, V, J, O and R proportional to the powers contained in the various radiation bands (violet, indigo, blue, green, yellow, orange and red) of the spectrum of the light emitted by the element that is being considered. It is necessary to combine together these electric voltages U, I, B, V, J, O, R for obtaining the electric voltage T that constitutes the coded color signal to be transmitted simultaneously to the corresponding receiver. For that purpose I amplify the seven voltages U, I, B, V, J, O and R by means of tubes LU, LI, LB, LV, LJ, LO and LR and the amplified voltages are transmitted to the control grids of the various slope tubes $lu$, $li$, $lb$, $lv$, $lj$, $lo$, $lr$ by means of connecting condensators KU, KI, KB, KV, KJ, KO, KR. Furthermore, these amplified voltages are added together and the resultant voltage (U+I+B+V+J+O+R) is applied to the grid of tube L (R+O+J+V+B+I+U). The voltage collected across the terminals of the external anodic resistance of this last tube serves simultaneously to polarize the grid of the seven variable slope tubes $lr$, $lo$, $lj$, $lv$, $lb$, $li$, $lu$. I thus obtain across the terminals of external anodic resistances of these seven variable slope tubes electric voltages respectively proportional to $$r = \frac{R}{R+O+J+V+B+I+U}$$
$$o = \frac{O}{R+O+J+V+B+I+U}$$
$$j = \frac{J}{R+O+J+V+B+I+U}$$
$$v = \frac{V}{R+O+J+V+B+I+U}$$
$$b = \frac{B}{R+O+J+V+B+I+U}$$
$$i = \frac{I}{R+O+J+V+B+I+U}$$
$$u = \frac{U}{R+O+J+V+B+I+U}$$

These voltages $r$, $o$, $j$, $v$, $b$, $i$ and $u$ are respectively applied to the deflecting means DR, DO—DO′, DJ, DV—DV′, DB, DI—DI′ and DU of cathode rays beam issuing from the cathode $\gamma$ of cathode oscillograph OC. At one end of the bulb of OC is provided a graduated transparency grid such as that of Fig. 23a and behind this grid G is a collecting anode A. I obtain across the terminals of external resistance RT the desired coded voltage T (color signal).

Owing to Wenheld's cylinder $\mu$ (grid for controlling the intensity of the cathode rays beam of coding tube OC) it is possible, by operating rheostat $rh$ temporarily, to cut off this cathode rays beam when black and white images are transmitted.

Fig. 23a shows a modification of the optical system for obtaining two images of the object $Ob$ having exactly the same point of view, one on photoelectric surface $Ph_1$ and the other on the upper horizontal face of the camera $Ca$ that contains the slot F of spectrograph S. In this modification, I make use of half silvered mirror MSA which splits into two portions the luminous beam emitted from an element of the televisioned object $Ob$ through objective $\Omega$. One half of this beam passes through objective $\omega_1$ and falls on $Ph_1$ while the other half passes through objective $\omega_2$ and falls on revolving mirror $mt$ which reflects it onto camera $Ca$. $Ph_1$ is optically conjugated with $Ob$ with reference to $\omega_1\Omega$ and the reflecting face of mirror MSA. The plane of the upper horizontal face of camera $Ca$, which contains slot F, is optically conjugated with $Ob$ with reference to $\Omega$, $\omega_2$ and $mt$. Finally, this plane is optically conjugated with $Ph_2$ with reference to the optical system $\omega_2\delta$ of the spectrograph. Before proceeding to a transmission of colored images, the apparatus shown by Fig. 23 is adjusted by using as televisioned objects, a white, a violet, an indigo, a blue, a green, a yellow, an orange, and a red surface successively, each of these surfaces being of a uniform color. In the course of this adjustment, I act upon rheostats RU, RI, RB, RV, RJ, RO, RR and $Rt$ and also on the feeds of corresponding vacuum tubes, in such manner as to obtain, for each colored surface, an electric voltage T of the desired value corresponding, according to the signalling code that is chosen, with the color of said surface.

In the color television receivers shown by Figs. 21 and 21b, I may replace the coding tube C, which has a thread-like cathode and a graduated transparency grid provided with horizontal slots, by a cathode ray tube having either four resistant anodes, $arn$, $arb$, $arv$, $arr$, in the case of Fig. 21, or having three resistant anodes $arb$, $arv$, $arr$, in the case of Fig. 21b. This coding tube C would work on the principle of Fig. 15. Its cathode would be constituted by four (or three) punctual sources of electrons superposed along a vertical and the electronic images of which would move simultaneously (under the action of the electric voltage T which constitutes the coded color signal) along the four (or three) resistant anodes. Each of these anodes is constituted, for instance, by a thin metallic deposit formed on a dielectric support, this deposit being limited, on the one hand, by a horizontal rectilinear edge, and, on the other hand, by a metallic "jaw" (of negligible electric resistance). The outline of this "jaw" is determined according to the indications above given concerning Fig. 21a. This jaw constitutes the output terminal of the resistant anode connected to the corresponding rheostat located on the outside of coding tube C. At a given time, the electronic image of one of the punctual sources of electrons of the cathode is located at a given point of the horizontal rectilinear edge of the metallic deposit that constitutes the resistant anode corresponding to the considered source of electrons, whereby the electric resistance of said anode at this time is proportional to the width of the metallic deposit at this point (distance between the rectilinear edge and the "jaw" having a predetermined outline).

The determination of the values of electric resistances $r_1 r_2 \ldots$ which connect with the corresponding rheostats ($rb$, $rj$, $rr$ or $rp$) the various elements of one of the four multiple anodes ($ab$, $aj$, $ar$ or $ap$) of decoding cathode rays tube C shown on Fig. 7 can advantageously be effected by means of geometrical construction above described (Fig. 21a) for the determination of the widths of slots $p_n$, $p_b$, $p_v$, $p_r$ of the graduated transparency grid G of decoding cathode ray tube C of Fig. 21. For this determination of resistances ($r_1$, $r_2$) acting as connections with the corresponding rheostats located on the outside of cathode ray tube C, it is desirable to divide each multiple anode ($ab$, $aj$, $ar$ or $ap$) into a number of elements equal to the number, in the signaling code that is adopted, of distinct values of the coded color signal T. I separately determine, for each of these values of T, the four values of the connection electric resistances corresponding to the four elements of anodes $ab$, $aj$, $ar$ and $ap$ which are located one above the other along the vertical line on which coil B (subjected to the electric voltage T that is considered) brings the rectilinear electronic image of the thread-like cathode $\gamma$ of the tube C of Fig. 7. This method of determining the connecting resistances is more accurate than that above described by way of example.

Fig. 24 shows a modification of television receivers according to my invention of the type illustrated by Figs. 7, 21 and 21b. The essential feature of this modification consists in replacing the three (or four) cathode ray oscillographs of these embodiments (on which were formed three (or four) respective images synchronously scanned by the corresponding cathode rays beams and subsequently superposed on a projection screen through suitable optical means) by a single cathode ray oscillograph, so as not only to reduce the cost of the color television receiver, but also to simplify the optical or electric adjustments necessary for obtaining a good reception of color images.

The principle of this modification is visible on Fig. 24, which illustrates an embodiment corresponding to that of Fig. 21, above described. The signals received by antenna AR and amplified by amplifier A produce, after passage through band-pass filters $Fbi$ and $Fbs$ and demodulators $DMt$ and $DMT$, a brightness signal $t$, a coded color signal T and a synchronizing signal $\tau$. The brightness signal $t$ is applied to the electrode $\mu$ serving to the modulation of the intensity of the cathode rays beam issued from the thread-like cathode $\gamma$ of cathode rays switch device C (decoding tube), fed from electric energy sources $P_1$, $P_2$. The color signal T acts upon the coil B that serves to the magnetic deviation of this cathode rays beam, whereby, at any time, the electronic image of cathode $\gamma$ is formed on a given vertical of anode G, which is provided with three slots $p_v$, $p_b$, $p_r$ of given outline. On the corresponding anodes $a_v$, $ab$, $a_r$ are collected electronic fluxes corresponding respectively to the proportions in which the three basic colors (blue, green and red for instance) are to be mixed for obtaining the hue which, in the code that is used, corresponds to the coded signal T.

The alternating electric voltages thus produced across the terminals of the output rheostats $r_b$, $r_v$, $r_r$ of switch device C are applied through condensers $K_b$, $K_v$, $K_r$ to the modulation electrodes $g_b$, $g_v$, $g_r$ (Wenhelt cylinders) of the three cathode rays beams of cathode ray tube oscillograph O, which includes a fluorescent screen $Fl$. The corresponding cathodes $c_b$, $c_v$, $c_r$ are heated by means of filaments in shunt with the source of heating current $Sc$. Rheostats $r'_b$, $r'_v$, $r'_r$ permit of adjusting the heating currents of these cathodes in such manner as to equalize their electronic emissions despite the unavoidable differences existing between these cathodes. A source of direct current serves to polarize each of the modulation electrodes $g_b$, $g_v$, $g_r$ negatively with respect to the corresponding cathode. Owing to the provision of rheostats $r''_b$, $r''_v$, $r''_r$, it is possible to adjust these polarizations individually and in an accurate manner. In front of the three Wenhelt cylinders $g_b$, $g_v$, $g_r$ are disposed concentrations anodes (or first anodes) $a_{1b}$, $a_{1v}$, $a_{1r}$ the potentials of which (positive with respect to cathodes $c_b$, $c_v$, $c_r$) are produced by direct current source $Sa1$ and can be individually adjusted in an accurate manner by means of rheostats $r'''_b$, $r'''_v$, $r'''_r$.

Insulating plates, constituted for instance by thin sheets of mica $i_1$, $i_2$, separate from one another the juxtaposed electron projecting means, the three Wenhelt cylinders $g_b$, $g_v$, $g_r$ being disposed above one another in the same vertical plane. Finally, the second anodes $a2b$, $a2r$ (which, in association with the first anodes $a_{1b}$, $a_{1v}$, $a_{1r}$, play the part of "electrostatic lenses") are brought to the same positive potential (high with reference to cathodes $c_b$, $c_v$, $c_r$) by means of direct current source $Sa2$. The metallic deposit (not shown on Fig. 1) applied on the inner wall of the glass bulb of oscillograph O is also at this potential. In front of anode $a2b$ is provided a pair of horizontal plates $Pb$ producing a constant electrostatic deflection in the downward direction of the cathode rays beam issuing from cathode $c_b$, owing to a source of direct current $Sd$. The same source $Sd$ is connected to the pair of deflecting plates $Pr$ disposed in front of anode $a_r$ which serve to produce an upward constant electrostatic deflection of the cathode rays beam issuing from cathode $c_r$. These deflections (respectively in the upward and downward directions) can be separately adjusted by means of rheostats $R_b$ and $R_r$.

The holes provided in the vertical front bases of Wenhelt cylinders $g_b$, $g_v$, $g_r$ are in the shape of small rectangles the width of which is equal to thrice the height. By means of rheostats $R_b$ and $R_r$, it is possible to bring the electronic images of the holes of the Wenhelt cylinders onto fluorescent screen $Fl$ and therefore to cause the corresponding luminous images $c'_b$, $c'_v$, $c'_r$ to occupy exactly superposed positions as shown by Fig. 24a. By acting on the other above cited rheostats (heating of the cathodes, polarization of the Wenhelt cylinders and of the first anodes), it is possible to give these three luminous images $c'_b$, $c'_v$, $c'_r$ means brightnesses having the desired relative values.

On the other hand, the synchronizing signal $\tau$ acts on the relaxation oscillation generator $sy$, which feeds the horizontal and vertical beam deflecting coils, $bh$ and $bv$ respectively, of oscillograph O. Consequently, the group of three images $c'_b$, $c'_v$, $c'_r$, which moves as a whole, sweeps the area of fluorescent screen $Fl$ in synchronism with the scanning of the televisioned object at the corresponding television transmitter, three superposed horizontal lines being simultaneously swept.

By means of an optical device diagrammatically represented by lens $\Omega$, and which in fact consists either of an objective of great aperture ($f1.5$ for instance) or of a Schmidt telescope constituted by a spherical mirror associated with a lens, the image of fluorescent screen $Fl$ is formed on the rear face of projections screen EP, which carries a three-colored network of lines in which three horizontal bands, respectively blue, green and red, alternate in a regular way. Fig. 24b is a partial detail view showing the disposition of two groups of three bands of three different colors $b_1$, $v_1$, $r_1$ and $b_2$, $v_2$, $r_2$. On its frontward face, that is to say on the side where are the spectators, this projecting screen is provided with a very thin layer of opal, or glass fibres, or a translucent paper, or is suitably dulled, etc., so as to diffuse light rays. Owing to the fact that the luminous image of screen $Fl$ (colored by the three-color network of lines) is not formed exactly on this thin layer of opal or other light diffusing surface, and owing to the action of the luminous diffusion action exerted by said opal or other equivalent surface, the basic colors (blue, green and red) blend together on every image element for spectators looking at the projection screen (constituted by a film carrying the three-color network of lines and applied against a light diffusing plate).

An opal plated glass (obtained by depositing, on one face of a glass plate having parallel faces, an opal layer of a thickness of some tenths of a millimeter, the opal mixing with the superficial glass so as to give a milky appearance to this face) constitutes a good light diffuser, acting in all directions and absorbing but from 10 to 15 per cent of the light that flows therethrough. A glass plate one of the faces of which has been dulled, either by means of a jet of sand or as the result of a superficial attack with hydrofluoric acid, also produces a rather good diffusing action in all directions. A thin layer of glass fibers of a diameter averaging one hundredth of a millimeter has a slightly smaller diffusing action but has the following advantages:

1. It absorbs a smaller amount of light than opal glass;

2. If the glass fibres are disposed in a suitable direction, it is possible to obtain a directive diffusion diagram, and therefore to give preference to directions included in a solid angle within which the spectators are located;

3. The glass fibres, interposed between two continuous supports, produce an isothermic effect, which means that the whole of the two supports and of the glass fibres is equivalent, from the point of view of thermal insulation, to an air interval of several centimeters between the two supports, which permits of projecting a relatively intensive luminous flux without risks for the glass plate forming the outer support.

As shown by Fig. 24, the light rays transmitted from the fluorescent screen form an image in the plant of the three-color network of lines, then pass through the film that carries this network, reach the light diffusing layer (opal, dulled surface, glass fibres, and so on), and finally pass through the support of this light diffusing layer (which support is for instance constituted by a glass plate having parallel faces) before reaching the spectators' eyes. The thickness of the film that carries the three-color network of lines and the air interval between this film and the external glass plate is generally sufficient for giving a slightly blurred optical effect which is favorable to a good blending of the colors without however being detrimental to the clearness of the television image that is projected.

There are different manners of producing the film that carries the three-color network of lines. For instance, I may use one of the known methods of colored photography (the object that is photographed being a large size drawing on which alternately blue, green and red bands have been traced), or a colored printing method, or again a graphic method. Anyway, I make use, as far as possible of highly saturated colors since, by mixing together three monochromatic radiations represented by three points $P_1$, $P_2$, $P_3$ of the locus of the spectrum in Maxwell's triangle, it is possible to obtain all the hues represented by the points located inside triangle $P_1P_2P_3$.

The colored photography method that seems to be best adapted to the production of the desired three-color network of lines (constituting the rear face of the screen EP of Fig. 24) is the one making use of superposed emulsions on the same film (Kodachrom or Agfacolor Neu process). This method seems preferable, for the present particular purpose, to the Lumière process (Autochrome films) in which fine grains of three colors, thoroughly mixed together, are utilized.

In the method making use of superposed emulsions, a transparent support, preferably constituted by an ininflammable film, carries: (a) an emulsion sensitive to red and blue; (b) a layer of colorless gelatine; (c) an emulsion sensitive to green and blue; (d) a layer of gelatine constituting a temporary filter; and (e) an unchromatized emulsion sensitive only to violet-blue.

The face of the film that is subjected to the action of light in the photographic chamber is the uncoated face thereof. The incident light forms, through its blue radiations, the image of the yellow component on the external face. Owing to the intermediate yellow filter (temporary filter) the second emulsion (acted upon only by green radiations) record the image of the rose components. Finally, the emulsion that is closest to the support (acted upon only by red radiations) records the image of the blue-green component. Finally, the three positive images are respectively in yellow, rose, and green-blue and thus the colors of the blue, green and red drawing that has been photographed are reproduced because the use of three dyes or three pigments, respectively green-blue, rose and yellow optically corresponds, in substractive synthesis, to the use of red, green, and violet-blue colored light. The network of lights thus obtained is free from granulation and has a good transparency.

Being given a given cathode ray oscillograph O and a given objective $\Omega$, it is possible to correct the residual aberrations (of optical, electric, or geometric origin) in the following manner: By means of objective $\Omega$, located in its normal position with respect to oscillograph O, I prepare a large size positive photograph on sensitive paper of the network of lines produced by the sweeping of fluorescent screen $Fl$ by the three cathode rays beams adjusted for working in normal conditions from the point of view of the displacement of the triple cathode ray spot, but with brightnesses of $c'_b$, $c'_v$, $c'_r$ equal between them and kept constant. This photograph therefore represents white strips separated by fine black rays which are not rigorously rectilinear, due to the above mentioned residual aberrations. The widened strips thus obtained are painted alternately with the saturated colors that are chosen (violet-blue, green, red). The colored drawing thus obtained is photographed on a film with superposed emulsions of the desired final size to be obtained for the projection screen EP, and it is this colored photograph on a film that serves to constitute the particular projection screen to be used in combination with the oscillograph O and the objective Ω in question.

Another method of preparing the three-colored network of lines of screen EP is analogous to the method of preparing Dufaycolor films for colored photographs. A cellulosic film is first colored (for instance in green) over its whole area, after which it receives a line network by printing with thick ink forming a reserve. In the interstices of this network, the film is discolored, then colored in violet blue, after which the ink reserve is eliminated. The film thus obtained carries alternately violet-blue and green strips exactly adjoining one another, the width of the green strips being twice that of the violet-blue strips. Another line network is then printed on the film in such manner as to cover with thick ink the whole width of the violet-blue strips and one half of the adjoining green strips. Then the film is discolored and subsequently colored in red. After elimination of the ink, the final network is constituted by strips all of the same width, alternately red, green and violet-blue. Finally, this network is covered with an insulating varnish consisting chiefly of artificial resins and plastifiers spread by atomizing of a benzenic solution, this varnish constituting a very thin, impervious and highly adhesive layer which protects the underlaying three-colored network.

In this case also, in order to correct the residual aberrations, I first prepare a positive photograph of the sweeping of fluorescent screen Fl (through objective Ω) on a large size sensitive paper. By cutting impervious thin sheets, I prepare masks or stencils which permit of applying fat ink, acting as a reserve, on the cellulosic film, so as to produce the desired alternately violet-blue, green, and red strips.

Another method of obtaining the three-colored line network of screen EP consists in tracing, by means of three drawing pens parallel thin strips with inks respectively of blue-violet, green, and red colors. The support on which these strips are traced may be a thin layer of transparent gelatine (on a cellulosic film or an extra-thin glass plate, for instance), in which case I make use of inks preferably containing anilin colors mixed with gum arabic). This support may also consist of a celluloid sheet, in which case it is necessary to make use of acid dyes and then to cover with a cellulose acetate varnish, dissolved in a suitable solvent, in order to protect Celluloid against risks of fire. In this graphic method, the three drawing pens (loaded with inks of different colors) are slowly displaced by a precision mechanism (analogous to that of dividing machines), these three drawing pens being offset with respect to one another so that each strip is given time to dry before the next one is traced.

In this case, correction of the residual aberrations is more difficult, although it can be obtained by controlling the movements of the drawing pens by means of a pantograph associated with "guides" deduced from an enlarged photograph of the scanning of fluorescent screen Fl.

I may also confound projection screen EP and fluorescent screen Fl. In this case, the line network is obtained by superposing layers of substances having a good resistance to heat and alternately high and low refractive indexes, these superpositions being made in a suitable manner along juxtaposed parallel strips. Owing to the luminous interferences that take place through such superpositions, it is possible to obtain (without pigments or coloring matters) alternately violet-blue, red, and green strips. The absence of any absorbing substance then permits of obtaining a good luminous efficiency. On the other hand, the glass plate thus prepared can without inconvenience be heated for welding it to the conical portion of the bulb of cathode ray oscillograph O, after which the fluorescent substance of screen Fl is deposited in the usual way on the superposition which constitutes the three-colored line network. Either before or after this welding of one glass portion to the other, the other face of the glass plate that forms the end wall of bulb O (i. e. the outer face of the bulb, which is directly seen by the spectator) is suitably dulled or covered with a thin face of opal.

In order to diffuse the luminous rays, and to ensure the desired optical blending of the colors of the three colored line network, I may, instead of dulling the glass surface or coating it with a thin layer of opal, make use of a kind of embossing. It is thus possible, in particular, to apply the Keller-Dorian process of colored cinematography, in which there is associated with a film one face of which is embossed a three-colored screen acting as diaphragm for a photographic objective.

While I have, in the above description, disclosed what I deem to be practical and efficient embodiments of the present invention, it should be well understood that I do not wish to be limited thereto as there might be changes made in the arrangement disposition and form of the parts without departing from the principle of the present invention as comprehended within the scope of the appended claims.

What I claim is:

1. In the transmitter of a color television system of the type in which a brightness signal and a coded color signal correspond to the elemental area of a televisioned picture that is being scanned at a given instant, a coding device comprising in combination an electronic tube including an electron gun, an anode reproducing a colorimetric diagram, a single output circuit connected to said anode, electrical means responsive to the color characteristics of said elemental area and acting upon the electron beam for automatically locating the end of said beam on said anode at the point which represents the color of said elemental area in said colorimetric diagram and means for automatically varying the flow of electrons through said output circuit as a function of the position of the point where said beam impinges on said anode.

2. A coding device according to claim 1 in which the anode reproducing a colorimetric diagram comprising a plurality of elements electrically insulated from one another and having respectively the shapes of the various sectors corresponding, in said colorimetric diagram, to the various colors that the human eye can practically differentiate, the electron flow varying means being constituted by a plurality of resistances of different respective values each interposed between one anode element and said single output circuit.

3. A coding device according to claim 1 in which the anode reproducing a colorimetric diagram is a resistant anode connected at one end to the output circuit of said tube, and thus constitutes said electron flow varying means.

4. A coding device according to claim 1 in which the electron flow varying means include a grid of variable electronic transparency located in front of said anode.

5. A coding device according to claim 1 in which the colorimetric diagram reproduced by the anode of the electronic tube is an orthogonal Maxwell's color triangle in conformity with the XYZ colorimetric system of the International Illumination Commission and showing the main color contour and the equal colorimetric purity contours.

6. A coding device according to claim 1 in which the colorimetric diagram reproduced by the anode of the electronic tube is a simplified representation of Maxwell's color triangle the apexes of which correspond to three arbitrarily standardized primary basic colors.

7. A coding device according to claim 1 in which the colorimetric diagram reproduced by the anode of the electronic tube is a simplified representation of Maxwell's color triangle the apexes of which correspond to three arbitrarily standardized primary basic colors, said coding device further including an electric device for differentiating purple colors from the other colors.

8. A coding device according to claim 1 in which the colorimetric diagram reproduced by the anode of the electronic tube is a Newton's color circle.

9. In the receiver of a color television system of the type in which a brightness signal and a coded color signal correspond to the elemental area of a televisioned picture that is being scanned at a given instant, a decoding device, operative by said signals received from the transmitter, comprising in combination an electronic tube including an electron gun with a rectilinear cathode, an electrode operative by said brightness signal for modulating the intensity of the electron beam, a plurality of anodes forming together a composite anodic surface, one output circuit connected to each of said anodes, electrical means operative by said coded color signal for deflecting the electron beam of said tube, and means for automatically varying the flows of electrons through said respective output circuits as a function of the position of the rectilinear electronic image of the cathode on said composite surface.

10. A decoding device according to claim 9 in which each of said anodes includes a plurality of elements, the electron flow varying means through each output circuit including a plurality of resistances of different values interposed between said circuit and the respective elements of the anode corresponding thereto.

11. A decoding device according to claim 9 in which the composite anodic surface of the electronic tube comprises a plurality of resistant anodes each connected at one end to a corresponding output circuit, whereby said anodes constitute by themselves said electron flow varying means.

12. A decoding device according to claim 9 in which said electron flow varying means include a grid of variable electronic transparency located in front of the anodic composite surface, said grid comprising various slots of different widths respectively in front of the various anodes forming said composite surface.

13. In a color television system of the type in which a brightness signal and a coded color signal correspond to the elemental area of a televisioned picture that is being scanned at a given instant, a receiving station comprising in combination a decoding device according to claim 9 having three output circuits corresponding to three basic primary colors, a fixed translucent projection screen provided with a three-colored lined network, a cathode ray oscillograph having a fluorescent screen in front of said projection screen, three electron guns generating three cathode rays beams, means for modulating the respective intensities of said beams in response to the three currents of said three output circuits of said decoding device, and means for scanning said fluorescent screen by means of said three cathode rays beams parallel to the lines of said three-colored lined network.

14. In a color television system of the type in which a brightness signal and a coded color signal correspond to the elemental area of a televisioned picture that is being scanned at a given instant, a transmitting station comprising in combination an optical system giving two images of the televisioned picture, means for scanning the first image and generating said brightness signal, means for successively exploring parallel elemental lines of the second image associated with spectrographic means for decomposing the light of said second image into seven homochromatic bands of radiations, and a coding device according to claim 1 including an electronic tube with an anode reproducing Newton's color circle, seven electron beam deflecting means, means responsive to the respective luminous intensities of said seven homochromatic bands for controlling said seven deflecting means respectively, and an output circuit of said electronic tube generating said coded color signal.

GEORGES VALENSI.

REFERENCES CITED

The following references are of record in the file of this patent:

UNITED STATES PATENTS

| Number | Name | Date |
|---|---|---|
| 2,294,820 | Wilson | Sept. 1, 1942 |
| 2,335,180 | Goldsmith | Nov. 23, 1943 |
| 2,375,966 | Valensi | May 15, 1945 |
| 2,389,979 | Huffnagle | Nov. 27, 1945 |

FOREIGN PATENTS

| Number | Country | Date |
|---|---|---|
| 524,443 | Great Britain | Aug. 7, 1940 |